US009782770B2

(12) United States Patent
Buermann et al.

(10) Patent No.: US 9,782,770 B2
(45) Date of Patent: Oct. 10, 2017

(54) SYSTEMS AND METHODS OF LOADING OR REMOVING LIQUIDS USED IN BIOCHEMICAL ANALYSIS

(71) Applicant: ILLUMINA, INC., San Diego, CA (US)

(72) Inventors: Dale Buermann, San Diego, CA (US); Sebastian Bohm, San Diego, CA (US); Alexander Hsiao, Los Angeles, CA (US)

(73) Assignee: Illumina, Inc., San Diego, CA (US)

( * ) Notice: Subject to any disclaimer, the term of this patent is extended or adjusted under 35 U.S.C. 154(b) by 179 days.

(21) Appl. No.: 14/712,409

(22) Filed: May 14, 2015

(65) Prior Publication Data

US 2015/0352544 A1 Dec. 10, 2015

Related U.S. Application Data

(60) Provisional application No. 62/008,974, filed on Jun. 6, 2014.

(51) Int. Cl.
*B01L 3/00* (2006.01)
*G01N 35/00* (2006.01)
(Continued)

(52) U.S. Cl.
CPC ....... *B01L 3/0289* (2013.01); *B01L 3/502715* (2013.01); *B01L 3/502784* (2013.01);
(Continued)

(58) Field of Classification Search
CPC ........ B01L 3/502; B01L 3/50; B01L 2300/14; B01L 2300/00; A61J 38/00; G01N 35/0092; G01N 35/00
(Continued)

(56) References Cited

U.S. PATENT DOCUMENTS

2003/0007898 A1* 1/2003 Bohm .................... B01D 57/02 422/504
2013/0116128 A1* 5/2013 Shen ................ B01L 3/502792 506/2

OTHER PUBLICATIONS

Yuejun Zhao and Sung Kwon Cho; Micro Air Bubble Manipulation by Electrowetting on Dielectric (EWOD): Transporting, Splitting, Merging, and Eliminating of Bubbles; Lab Chip; 2007; p. 273-280; The Royal Society of Chemistry.

(Continued)

*Primary Examiner* — Christine T Mui
(74) *Attorney, Agent, or Firm* — Jason P. Gross; The Small Patent Law Group, LLC.

(57) ABSTRACT

System configured to conduct designated reactions for biological or chemical analysis. The system includes a liquid-exchange assembly comprising an assay reservoir for holding a first liquid, a receiving cavity for holding a second liquid that is immiscible with respect to the first liquid, and an exchange port fluidically connecting the assay reservoir and the receiving cavity. The system also includes a pressure activator that is operably coupled to the assay reservoir of the liquid-exchange assembly. The pressure activator is configured to repeatedly exchange the first and second liquids by (a) flowing a designated volume of the first liquid through the exchange port into the receiving cavity and (b) flowing a designated volume of the second liquid through the exchange port into the assay reservoir. The system also includes a fluidic system that is in flow communication with the liquid-exchange assembly.

21 Claims, 9 Drawing Sheets

(51) Int. Cl.
*B01L 3/02* (2006.01)
*B01L 7/00* (2006.01)

(52) U.S. Cl.
CPC ........... *B01L 7/52* (2013.01); *B01L 2200/027* (2013.01); *B01L 2200/0673* (2013.01); *B01L 2200/10* (2013.01); *B01L 2200/143* (2013.01); *B01L 2300/0816* (2013.01); *B01L 2400/0406* (2013.01); *B01L 2400/0415* (2013.01); *B01L 2400/0427* (2013.01); *B01L 2400/0487* (2013.01); *Y10T 436/11* (2015.01)

(58) Field of Classification Search
USPC .................. 422/509, 501, 500, 50; 435/6.11; 436/501, 43
See application file for complete search history.

(56) References Cited

OTHER PUBLICATIONS

Wataru Satoh, Hiroomi Yokomaku, Hiroki Hosono, Noriyuki Ohnishi, Hiroaki Suzuki; Electrowetting-based Valve for the Control of the Capillary Flow; Journal of Applied Physics; Feb. 6, 2008; Japan.
Cristina Neagu, Henri Jansen, Han Gardeniers, Miko Elwenspoek; The Electrolysis of Water: An Actuation Principle for MEMS With a Big Opportunity; Mechatronics; 2000; p. 571-581; Elsevier Science Ltd.; The Netherlands.
Jan C. T. Eijkel and Albert Van Den Berg; Young 4ever—The Use of Capillarity for Passive Flow Handling in Lab on a Chip Devices; Lab Chip; 2006; p. 1405-1408; The Royal Society of Chemistry.

* cited by examiner

SYSTEMS AND METHODS OF LOADING OR REMOVING LIQUIDS USED IN BIOCHEMICAL ANALYSIS

CROSS-REFERENCE TO RELATED APPLICATIONS

The present application claims the benefit of U.S. Provisional Application No. 62/008,974, filed on Jun. 6, 2014 and entitled the same, which is incorporated herein by reference in its entirety.

BACKGROUND

The subject matter herein relates generally to systems and methods of loading or removing liquids and, more specifically, to systems and methods of loading reagents or removing waste from assay systems that use the liquids for biochemical analysis.

Various protocols in biological or chemical analysis involve performing a large number of controlled reactions at designated support surfaces or within designated reaction chambers. The reactions may then be observed, detected, or otherwise analyzed to identify or reveal properties of chemicals involved in the reactions. One technology used to conduct such reactions is digital fluidics (DF). DF uses electrowetting-mediated operations to move and manipulate droplets of liquid. The droplets may be located within a DF device, such as an enclosed cartridge, that includes one or more substrates configured to form a surface or gap for conducting droplet operations. The substrate(s) or the gap may be coated or filled with a filler liquid that is immiscible with respect to the liquid that forms the droplets. Electrodes are arranged within or along the substrate(s) and are configured to provide different electric fields in accordance with a predetermined sequence to transport, mix, filter, monitor, and/or analyze liquid within the DF device. Various assay protocols may be performed by manipulating the droplets. By way of example only, DF technology may be used in quantitative analysis of DNA (qPCR) and RNA (RT-qPCR), protein analysis using both enzymatic and immunoassay techniques, DNA sequencing (e.g., sequencing-by-synthesis), sample preparation, and preparation of fragment libraries for next generation sequencing. DF technology has also been proposed for manufacturing lab-on-chip (LOC) devices, such as disposable single-use devices, that are capable of performing a particular assay protocol.

At least some DF devices are configured to perform a particular assay protocol that includes a relatively limited number of reactions. Upon completion of the assay, the DF device may be discarded. It may be desirable to have DF devices that are capable of performing more reactions than the known DF devices and/or that are capable of being re-used for different assays. Increasing the number of reactions, however, requires a larger amount of reagents. It can be difficult to load liquids into the DF devices because of the small size of the DF devices and the small volumes of reagents that are used when performing the assays. Moreover, a large number of different reagents may be used. For example, in some applications, thirty-two different reagents must be loaded into the DF device.

DF devices are often manually loaded using pipettes or syringes. Manual loading carries a risk of user error and/or contamination and can be costly. For instance, if a single reagent is loaded into an incorrect port of the DF device, it may be necessary to discard the entire DF device. Although loading methods have been proposed, such methods may not be commercially reasonable and/or may not fully address the loading challenges discussed above.

One potential consequence in increasing the number of reactions is that a larger amount of liquid waste may accumulate within the system. In at least some known devices, the liquid waste is never removed from the system. For example, the liquid waste is permitted to accumulate within the DF device and is discarded with the DF device after the assay protocol has been completed. If systems are configured to conduct a greater number of reactions and/or be re-used, it may be necessary to remove the waste during operation of the DF device or without disposing of the entire DF device.

Other than DF devices, various types of assay systems may benefit from improved liquid loading and/or removal. For example, continuous-flow assay systems often mix a number of reagents into a common flow channel using a multi-purpose valve. The mixture may then be directed through a fluidic device, such as a flow cell, where designated reactions occur and are detected.

Accordingly, there is a need for methods and systems that are capable of loading and/or removing one or more liquids used by fluidic systems.

BRIEF DESCRIPTION

In an embodiment, a system configured to conduct designated reactions for biological or chemical analysis is provided. The system includes a liquid-exchange assembly comprising an assay reservoir for holding a first liquid, a receiving cavity for holding a second liquid that is immiscible with respect to the first liquid, and an exchange port fluidically connecting the assay reservoir and the receiving cavity. The system also includes a pressure activator that is operably coupled to the assay reservoir of the liquid-exchange assembly. The pressure activator is configured to repeatedly exchange the first and second liquids by (a) flowing a designated volume of the first liquid through the exchange port into the receiving cavity and (b) flowing a designated volume of the second liquid through the exchange port into the assay reservoir. The system also includes a fluidic system that is in flow communication with the liquid-exchange assembly. The fluidic system is configured to conduct designated chemical reactions using at least one of the first liquid or the second liquid.

In an embodiment, a method is provided that includes fluidically coupling an assay reservoir holding a first liquid and a receiving cavity holding a second liquid through an exchange port. The first and second liquids are immiscible. The method also includes exchanging the first and second liquids by flowing a designated volume of the first liquid through the exchange port into the receiving cavity and flowing a designated volume of the second liquid through the exchange port into the assay reservoir.

In an embodiment, a liquid-transport assembly is provided that includes an assay reservoir including inlet and outlet ports. The assay reservoir is configured to hold a liquid and deliver the liquid through the outlet port. The liquid-transport assembly also includes a secondary chamber that is configured to hold an electrolytic solution and a loading gas. The secondary chamber is in flow communication with the inlet port of the assay reservoir. The liquid-transport assembly also includes a pressure generator that has first and second electrodes within the secondary chamber. The pressure generator provides a voltage between the first and second electrodes to generate the loading gas from the electrolytic solution, wherein a pressure imposed on the liquid in the assay reservoir increases as the loading gas is generated in the secondary chamber thereby causing the liquid to flow through the outlet port.

In an embodiment, a method is provided that includes providing an assay reservoir and a secondary chamber. The assay reservoir has inlet and outlet ports and holds a liquid therein. The secondary chamber is in flow communication with the inlet port of the assay reservoir and holds an electrolytic solution. The method also includes generating a loading gas in the secondary chamber through electrolysis, wherein a pressure imposed on the liquid in the assay reservoir increases as the loading gas is generated in the secondary chamber thereby causing the liquid to flow through the outlet port.

In an embodiment, a system is provided that includes an assay reservoir having an outlet port. The assay reservoir is configured to deliver a liquid through the outlet port. The system also includes a movable plug that is positioned within the assay reservoir. The movable plug blocks flow of the liquid when positioned at the outlet port. The system also includes a digital fluidics (DF) device having a receiving cavity configured to receive the liquid. The DF device includes electrodes for conducting electrowetting operations. The system also includes a loading mechanism having a plug-engaging surface and a loading motor that is coupled to at least one of the assay reservoir or the plug-engaging surface. The loading motor moves the assay reservoir and the plug-engaging surface relative to each other such that the plug-engaging surface displaces the movable plug with respect to the outlet port thereby permitting the liquid to flow through the outlet port into the receiving cavity.

In an embodiment, a method is provided that includes providing an assay reservoir and a digital fluidics (DF) device. The assay reservoir includes an outlet port and has a liquid therein. The DF device has a receiving cavity that is configured to receive the liquid from the assay reservoir. The method also includes blocking flow of the liquid through the outlet port using a movable plug and moving the assay reservoir and a plug-engaging surface relative to each other such that the plug-engaging surface displaces the movable plug. The liquid flows through the outlet port into the receiving cavity when the movable plug is displaced. The method also includes using the liquid to conduct electrowetting operations within the DF device.

In an embodiment, a system is provided that includes an assay reservoir configured to hold an aqueous solution. The assay reservoir includes an outlet port defined by an interior surface of the assay reservoir. The interior surface has a surface energy. The system also includes a digital fluidics (DF) device having a receiving cavity and a device channel in flow communication with the receiving cavity. The DF device includes electrodes positioned along the device channel that are configured to conduct electrowetting operations for moving droplets along the device channel. The receiving cavity is configured to hold a non-polar liquid and is located upstream with respect to the device channel. The system also includes a loading motor that is coupled to at least one of the assay reservoir or the DF device. The loading motor is configured to move the outlet port and the receiving cavity relative to each other such that the aqueous solution at the outlet port and the non-polar liquid in the receiving cavity engage each other. The interior surface is dimensioned and the surface energy is configured to retain the aqueous solution within the assay reservoir before the aqueous solution engages the non-polar liquid. The interior surface is dimensioned and the surface energy is configured to permit the aqueous solution to flow through the outlet port and into the receiving cavity when the aqueous solution engages the non-polar liquid.

In an embodiment, a method is provided that includes providing an assay reservoir holding an aqueous solution and a receiving cavity holding a non-polar liquid relative to each other. The assay reservoir has an outlet port. The method also includes positioning the outlet port a distance away from a fill line of the non-polar liquid in the receiving cavity. The aqueous solution experiences cohesive and adhesive forces that retain the aqueous solution at the outlet port when the aqueous solution and the non-polar liquid are spaced apart. The method also includes moving the assay reservoir and the receiving cavity relative to each other so that the aqueous solution and the non-polar liquid engage each other. The cohesive and adhesive forces are affected such that the aqueous solution flows through the outlet port and into the receiving cavity.

DETAILED DESCRIPTION

Figure 1:
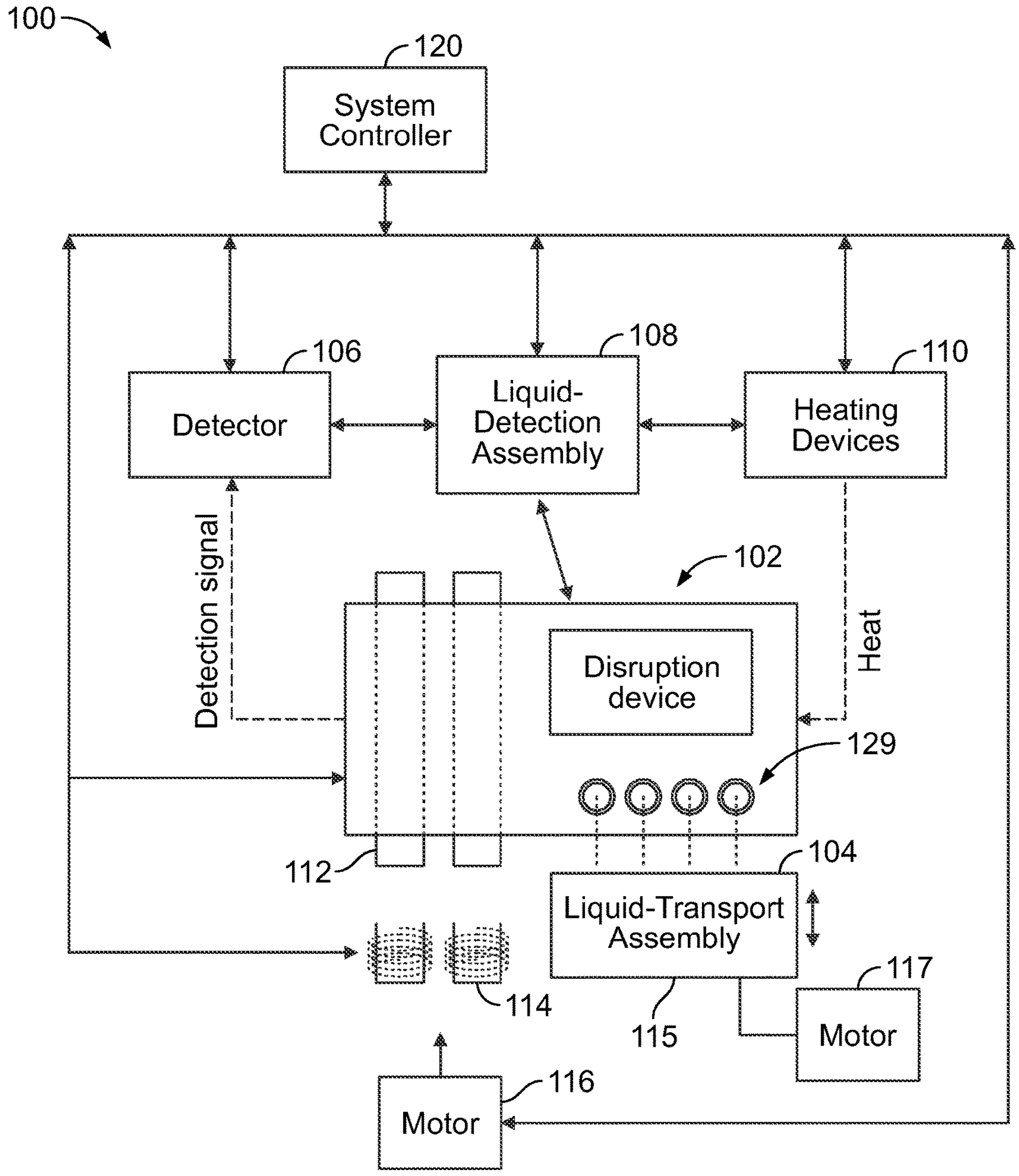
FIG. 1 is a block diagram of an assay system configured to conduct designated reactions formed in accordance with an embodiment.

Embodiments set forth herein may be used in various systems that use liquids to perform designated fluidic operations. Such fluidic operations may be conducted to perform biochemical analysis. As used herein, the term "biochemical analysis" is to be interpreted broadly and may include at least one of biological analysis or chemical analysis. Embodiments may be used to transport the liquid(s) to the system and/or transport the liquid(s) from the system. More specifically, embodiments may be used to load liquids that are used by the system or to remove liquids, such as waste, from the system. In some embodiments, the systems are fluidic systems. A fluidic system may include at least one fluidic device, such as a fluidic cartridge, a droplet actuator (or DF device), or a flow cell, for transporting liquids through a portion of the system. Other components of the system may not be fluidic, such as detectors, heaters, and the like. In particular embodiments, the fluidic systems or devices may include channels in which at least a portion of the channel is microfluidic.

In particular embodiments, the fluidic systems utilize digital fluidics (DF), which may also be referred to as digital fluidics (DMF) or electrowetting-on-dielectric (EWOD). However, embodiments set forth herein are not limited to DF applications and may be used in other systems that use liquids to perform biochemical analysis. For example, fluidic systems may use flow cells and detect certain events (e.g., fluorescent emissions) that occur within the flow cell. Fluidic systems may also include other devices, such as lab-on-chip (LOC) devices or micro-electro-mechanical systems (MEMS) devices. In some embodiments, the fluidic systems are single-use disposable devices, such as point-of-care (POC) devices.

In certain embodiments, the loading and/or removal of the liquids is automated. More specifically, the specific act that causes the loading or removal of the liquid may be without manual action by an individual. In some cases, systems may be configured to automatically position various components relative to one another to load and/or remove the liquids. In some cases, the systems may monitor the fluidic device to determine if liquids should be loaded into the fluidic device or if liquids should be removed from the fluidic device. The forces that cause the flow of liquids from a storage housing to the fluidic device or from the fluidic device to a storage housing may be passive forces (e.g., gravity, capillary forces) or active forces (e.g., forces caused by a pump).

A "liquid," as used herein, is a substance that is relatively incompressible and has a capacity to flow and to conform to a shape of a container or a channel that holds the substance. A liquid may be aqueous based and include polar molecules exhibiting surface tension that holds the liquid together. A liquid may also include non-polar molecules, such as in an oil-based or non-aqueous substance. It is understood that references to a liquid in the present application may include a liquid that was formed from the combination of two or more liquids. For example, separate reagent solutions may be later combined to conduct designated reactions. Different liquids may be miscible or immiscible. Liquids are immiscible if the liquids are incapable of mixing or being mixed (e.g., unable to blend or attain homogeneity) at designated conditions. For example, DF technology may include a filler liquid (e.g., oil) that is immiscible with respect to the droplets that are controlled by electrowetting.

Liquids, including droplets of liquids, may experience various forces within a system. These forces may be configures and utilized to achieve a designated flow of the liquids. Such forces may include cohesive forces (i.e., attractive forces between like molecules of the liquid) and adhesive forces (i.e., attractive forces between molecules of the liquid and a solid surface or vapor that surrounds the liquid). Cohesive and adhesive forces arise from the interaction of atoms and molecules that are located along, for example, a liquid-vapor interface and a liquid-solid interface. Another force that affects the flow of liquid in embodiments describe herein is gravity (or gravitational force) that is experienced by the liquid-of-interest but also other substances. For example, in some cases, a non-polar liquid (e.g., oil) may rest on top of an aqueous liquid in a reservoir. The weight of the non-polar liquid may affect the flow of the aqueous liquid out of the reservoir.

A liquid may have different wetting characteristics or properties based on properties of the surface that contacts the liquid. More specifically, a droplet of a liquid may have a contact angle that is based on properties of the liquid and the solid surface. A contact angle is the angle formed by the intersection of two planes tangent to the droplet and the corresponding solid surface that the droplet rests upon. The contact angle indicates a wetting ability of the liquid to the surface. Wetting is a liquid's ability to spread along a solid surface. The wetting of a solid surface by a liquid is controlled by the intermolecular interactions of molecules along an interface between the two phases. If the adhesive forces are relatively greater than the cohesive forces, the wetting of the liquid to the surface is greater (i.e., the contact angle will be relatively small). If the cohesive forces are relatively greater than the adhesive forces, the wetting of the liquid to the surface is smaller (i.e., the contact angle will be relatively large).

Surface tension in a liquid is caused by the cohesive forces of the liquid and, as such, can have an affect on the contact angle. As the surface tension increases, an ability of the liquid to reduce its surface area (i.e., bead up) also increases. Surfaces of solids, however, may be characterized as having a surface energy. As the surface energy of a solid increases, the ability of the solid to interact with the liquid also increases (i.e., the contact angle decreases). As an example, when a liquid of low surface tension is placed on a solid of high surface energy, the liquid spreads across the surface and has a small contact angle. If a liquid has a high surface tension and is placed on a surface of low surface energy, the liquid may form a bead on the surface and have a high contact angle. As described herein, the flow of the liquid through a channel may be, in part, based on the surface tension of the liquid and the surface energy of the solid surface.

Accordingly, embodiments described herein may utilize inherent properties of a liquid (e.g., the surface tension), inherent properties of a solid surface (e.g., surface energy), and a shape of the solid surface to control the flow of the liquid. In some cases, these parameters may collectively provide a capillary force, which may also be referred to as capillary action or a capillary effect. The capillary force may impede flow of a liquid (e.g., slow down or completely stop) through a channel. As one particular example, the capillary forces may prevent liquid stored within a reservoir from exiting the reservoir through an outlet port. It is noted that other factors may affect the contact angle or the wetting of a liquid to a solid. For example, a purity of the liquid or whether a surfactant is used may affect the surface tension of the liquid and the molecular interactions along the solid-liquid interface. A purity of the solid or whether a coating is placed on the solid surface may affect the surface energy of a solid. Also, temperature of the environment, a composition of the surrounding air, and the roughness or smoothness of the surface may all affect the interactions between the liquid and the solid surface. The concepts discussed above are discussed in greater detail in *Surfaces, Interfaces, and Colloids: Principles and Applications, Second Edition*, Drew Meyers, 1999, John Wiley & Sons, Inc. and in *Contact Angle, Wettability, and Adhesion*, edited by Robert F. Gould (1964), both of which are hereby incorporated by reference. The concepts are also described in U.S. Pat. No. 8,338,187, which is incorporated herein by reference in its entirety.

In some cases, a liquid may flow through a channel having a microfluidic portion. A “microfluidic channel” is a channel in which at least a portion of the channel has a cross-section in which surface tension and cohesive forces of the liquid and adhesive forces between the liquid and the surfaces of the channel have a significant effect on the flow of the liquid. For example, aqueous liquids may be unable to flow, without pumping or other active form of displacement, through a microfluidic channel due to capillary forces. By way of example, a maximum cross-sectional dimension of a microfluidic portion may be less than 1 mm or, more specifically, less than 0.6 mm, less than 0.5 mm, less than 0.4 mm, less than 0.3 mm, less than 0.2 mm, less than 0.1 mm or less than 0.05 mm or less.

As used herein, a “designated reaction” includes a change in at least one of a chemical, electrical, physical, or optical property (or quality) of an analyte-of-interest. In particular embodiments, the designated reaction is a positive binding event (e.g., incorporation of a fluorescently labeled biomolecule with the analyte-of-interest). More generally, the designated reaction may be a chemical transformation, chemical change, or chemical interaction. The designated reaction may also be a change in electrical properties. For example, the designated reaction may be a change in ion concentration within a solution. Exemplary reactions include, but are not limited to, chemical reactions such as reduction, oxidation, addition, elimination, rearrangement, esterification, amidation, etherification, cyclization, or substitution; binding interactions in which a first chemical binds to a second chemical; dissociation reactions in which two or more chemicals detach from each other; fluorescence; luminescence; bioluminescence; chemiluminescence; and biological reactions, such as nucleic acid replication, nucleic acid amplification, nucleic acid hybridization, nucleic acid ligation, phosphorylation, enzymatic catalysis, receptor binding, or ligand binding. The designated reaction can also be addition or elimination of a proton, for example, detectable as a change in pH of a surrounding solution or environment. An additional designated reaction can be detecting the flow of ions across a membrane (e.g., natural or synthetic bilayer membrane), for example as ions flow through a membrane the current is disrupted and the disruption can be detected.

In particular embodiments, the designated reaction includes the incorporation of a fluorescently-labeled molecule to an analyte. The analyte may be an oligonucleotide and the fluorescently-labeled molecule may be a nucleotide. The designated reaction may be detected when an excitation light is directed toward the oligonucleotide having the labeled nucleotide, and the fluorophore emits a detectable fluorescent signal. In alternative embodiments, the detected fluorescence is a result of chemiluminescence or bioluminescence. A designated reaction may also increase fluorescence (or Förster) resonance energy transfer (FRET), for example, by bringing a donor fluorophore in proximity to an acceptor fluorophore, decrease FRET by separating donor and acceptor fluorophores, increase fluorescence by separating a quencher from a fluorophore or decrease fluorescence by co-locating a quencher and fluorophore.

As used herein, a “reaction component” or “reactant” includes any substance that may be used to obtain a designated reaction. For example, reaction components include reagents, enzymes, samples, other biomolecules, and buffer solutions. The reaction components are typically delivered to a reaction site in a solution and/or immobilized at a reaction site. The reaction components may interact directly or indirectly with another substance, such as the analyte-of-interest.

As used herein, the term “fluidically coupled” (or like term) refers to two spatial regions being connected together such that a liquid may be transported between the two spatial regions. For example, an assay reservoir may be fluidically coupled with a cavity or channel of a fluidic device such that a liquid may be transported into the cavity from the assay reservoir. The term “fluidically coupled” (or like term) does not require a continuous flow between the two spatial regions. For example, although the liquid in the assay reservoir may passively flow into the fluidic device or may be actively pumped into the fluidic device, the liquid may then be transported in the form of multiple droplets through electrowetting-mediated operations. The term “fluidically coupled” may allow for two spatial regions being in flow communication through one or more valves, restrictors, or other fluidic components that are configured to control or regulate a flow of liquid through a system. Moreover, it is understood that a first spatial region may be upstream from a second spatial region (or the second spatial region may be downstream from the first spatial region) even though only a portion of the liquid in the first spatial region is directed to the second spatial region. For instance, an assay reservoir or a receiving cavity of the fluidic device may be fluidically coupled to multiple spatial regions within the fluidic device. Droplets of the liquid from the assay reservoir or the receiving cavity may be transported to different spatial regions within the fluidic device such that the liquid is distributed throughout the DF device.

In some embodiments, the fluidic device may have a biomolecule or biochemical substance immobilized to a surface within the fluidic device. As used herein, the term “immobilized,” when used with respect to a biomolecule or biochemical substance, includes substantially attaching the biomolecule or biochemical substance at a molecular level to a surface. For example, a biomolecule or biochemical substance may be immobilized to a surface of the substrate material using adsorption techniques including non-covalent interactions (e.g., electrostatic forces, van der Waals, and dehydration of hydrophobic interfaces) and covalent binding techniques where functional groups or linkers facilitate attaching the biomolecules to the surface. Immobilizing biomolecules or biochemical substances to a surface of a substrate material may be based upon the properties of the substrate surface, the liquid medium carrying the biomolecule or biochemical substance, and the properties of the biomolecules or biochemical substances themselves. In some cases, a substrate surface may be functionalized (e.g., chemically or physically modified) to facilitate immobilizing the biomolecules (or biological or chemical substances) to the substrate surface. The substrate surface may be first modified to have functional groups bound to the surface. The functional groups may then bind to biomolecules or biological or chemical substances to immobilize them thereon. A substance can be immobilized to a surface via a gel, for example, as described in US Patent Publ. No. US 2011/0059865 A1, which is incorporated herein by reference.

In some embodiments, nucleic acids can be attached to a surface and amplified using bridge amplification. Useful bridge amplification methods are described, for example, in U.S. Pat. No. 5,641,658; WO 07/010251, U.S. Pat. No. 6,090,592; U.S. Patent Publ. No. 2002/0055100 A1; U.S. Pat. No. 7,115,400; U.S. Patent Publ. No. 2004/0096853 A1; U.S. Patent Publ. No. 2004/0002090 A1; U.S. Patent Publ. No. 2007/0128624 A1; and U.S. Patent Publ. No. 2008/0009420 A1, each of which is incorporated herein in its entirety. Another useful method for amplifying nucleic acids on a surface is rolling circle amplification (RCA), for example, using methods set forth in further detail below. In some embodiments, the nucleic acids can be attached to a surface and amplified using one or more primer pairs. For example, one of the primers can be in solution and the other primer can be immobilized on the surface (e.g., 5'-attached). By way of example, a nucleic acid molecule can hybridize to one of the primers on the surface followed by extension of the immobilized primer to produce a first copy of the nucleic acid. The primer in solution then hybridizes to the first copy of the nucleic acid which can be extended using the first copy of the nucleic acid as a template. Optionally, after the first copy of the nucleic acid is produced, the original nucleic acid molecule can hybridize to a second immobilized primer on the surface and can be extended at the same time or after the primer in solution is extended. In any embodiment, repeated rounds of extension (e.g., amplification) using the immobilized primer and primer in solution provide multiple copies of the nucleic acid.

As used herein, the term "droplet" means a volume of liquid on or within a droplet actuator. Typically, a droplet is at least partially bounded by a filler liquid. For example, a droplet may be completely surrounded by a filler liquid or may be bounded by filler liquid and one or more surfaces of the droplet actuator. As another example, a droplet may be bounded by filler liquid, one or more surfaces of the droplet actuator, and/or the atmosphere. As yet another example, a droplet may be bounded by filler liquid and the atmosphere. Droplets may, for example, be aqueous or non-aqueous or may be mixtures or emulsions including aqueous and non-aqueous components. Droplets may take a wide variety of shapes. Non-limiting examples include being generally disc shaped, slug shaped, a truncated sphere, an ellipsoid, spherical, a partially compressed sphere, hemispherical, an ovoid, cylindrical, combinations of thereof, and various shapes formed during droplet operations, such as merging or splitting or formed as a result of contact of such shapes with one or more surfaces of a droplet actuator. For examples of droplet liquids that may be subjected to droplet operations using the approach of the present disclosure, see Eckhardt et al., International Patent Pub. No. WO 2007/120241, entitled, "Droplet-Based Biochemistry," published on Oct. 25, 2007, the entire disclosure of which is incorporated herein by reference.

In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include a reagent, such as water, deionized water, saline solutions, acidic solutions, basic solutions, detergent solutions and/or buffers. A droplet can include nucleic acids, such as DNA, genomic DNA, RNA, mRNA or analogs thereof; nucleotides such as deoxyribonucleotides, ribonucleotides or analogs thereof such as analogs having terminator moieties such as those described in Bentley et al., Nature 456:53-59 (2008); Gormley et al., International Patent Pub. No. WO/2013/131962, entitled, "Improved Methods of Nucleic Acid Sequencing," published on Sep. 12, 2013; Barnes et al., U.S. Pat. No. 7,057,026, entitled "Labelled Nucleotides," issued on Jun. 6, 2006; Kozlov et al., International Patent Pub. No. WO/2008/042067, entitled, "Compositions and Methods for Nucleotide Sequencing," published on Apr. 10, 2008; Rigatti et al., International Patent Pub. No. WO/2013/117595, entitled, "Targeted Enrichment and Amplification of Nucleic Acids on a Support," published on Aug. 15, 2013; Hardin et al., U.S. Pat. No. 7,329,492, entitled "Methods for Real-Time Single Molecule Sequence Fetermination," issued on Feb. 12, 2008; Hardin et al., U.S. Pat. No. 7,211,414, entitled "Enzymatic Nucleic Acid Synthesis: Compositions and Methods for Altering Monomer Incorporation Fidelity," issued on May 1, 2007; Turner et al., U.S. Pat. No. 7,315,019, entitled "Arrays of Optical Confinements and Uses Thereof," issued on Jan. 1, 2008; Xu et al., U.S. Pat. No. 7,405,281, entitled "Fluorescent Nucleotide Analogs and Uses Therefor," issued on Jul. 29, 2008; and Rank et al., U.S. Patent Pub. No. 20080108082, entitled "Polymerase Enzymes and Reagents for Enhanced Nucleic Acid Sequencing," published on May 8, 2008, the entire disclosures of which are incorporated herein by reference; enzymes such as polymerases, ligases, recombinases, or transposases; binding partners such as antibodies, epitopes, streptavidin, avidin, biotin, lectins or carbohydrates; or other biochemically active molecules. Other examples of droplet contents include reagents, such as a reagent for a biochemical protocol, such as a nucleic acid amplification protocol, an affinity-based assay protocol, an enzymatic assay protocol, a sequencing protocol, and/or a protocol for analyses of biological fluids. A droplet may include one or more beads.

As used herein, a "droplet actuator" means a device, system, or assembly that is capable of manipulating droplets. In one or more embodiments, the droplets are manipulated using electrowetting-mediated operations. For examples of droplet actuators, see Pamula et al., U.S. Pat. No. 6,911,132, entitled "Apparatus for Manipulating Droplets by Electrowetting-Based Techniques," issued on Jun. 28, 2005; Pamula et al., U.S. Patent Pub. No. 20060194331, entitled "Apparatuses and Methods for Manipulating Droplets on a Printed Circuit Board," published on Aug. 31, 2006; Pollack et al., International Patent Pub. No. WO/2007/120241, entitled "Droplet-Based Biochemistry," published on Oct. 25, 2007; Shenderov, U.S. Pat. No. 6,773,566, entitled "Electrostatic Actuators for Fluidics and Methods for Using Same," issued on Aug. 10, 2004; Shenderov, U.S. Pat. No. 6,565,727, entitled "Actuators for Fluidics Without Moving Parts," issued on May 20, 2003; Kim et al., U.S. Patent Pub. No. 20030205632, entitled "Electrowetting-driven Micropumping," published on Nov. 6, 2003; Kim et al., U.S. Patent Pub. No. 20060164490, entitled "Method and Apparatus for Promoting the Complete Transfer of Liquid Drops from a Nozzle," published on Jul. 27, 2006; Kim et al., U.S. Patent Pub. No. 20070023292, entitled "Small Object Moving on Printed Circuit Board," published on Feb. 1, 2007; Shah et al., U.S. Patent Pub. No. 20090283407, entitled "Method for Using Magnetic Particles in Droplet Fluidics," published on Nov. 19, 2009; Kim et al., U.S. Patent Pub. No.

20100096266, entitled "Method and Apparatus for Real-time Feedback Control of Electrical Manipulation of Droplets on Chip," published on Apr. 22, 2010; Velev, U.S. Pat. No. 7,547,380, entitled "Droplet Transportation Devices and Methods Having a Liquid Surface," issued on Jun. 16, 2009; Sterling et al., U.S. Pat. No. 7,163,612, entitled "Method, Apparatus and Article for Fluidic Control via Electrowetting, for Chemical, Biochemical and Biological Assays and the Like," issued on Jan. 16, 2007; Becker et al., U.S. Pat. No. 7,641,779, entitled "Method and Apparatus for Programmable Fluidic Processing," issued on Jan. 5, 2010; Becker et al., U.S. Pat. No. 6,977,033, entitled "Method and Apparatus for Programmable Fluidic Processing," issued on Dec. 20, 2005; Decre et al., U.S. Pat. No. 7,328,979, entitled "System for Manipulation of a Body of Fluid," issued on Feb. 12, 2008; Yamakawa et al., U.S. Patent Pub. No. 20060039823, entitled "Chemical Analysis Apparatus," published on Feb. 23, 2006; Wu, International Patent Pub. No. WO/2009/003184, entitled "Digital Fluidics Based Apparatus for Heat-exchanging Chemical Processes," published on Dec. 31, 2008; Fouillet et al., U.S. Patent Pub. No. 20090192044, entitled "Electrode Addressing Method," published on Jul. 30, 2009; Fouillet et al., U.S. Pat. No. 7,052,244, entitled "Device for Displacement of Small Liquid Volumes Along a Micro-catenary Line by Electrostatic Forces," issued on May 30, 2006; Marchand et al., U.S. Patent Pub. No. 20080124252, entitled "Droplet Microreactor," published on May 29, 2008; Adachi et al., U.S. Patent Pub. No. 20090321262, entitled "Liquid Transfer Device," published on Dec. 31, 2009; Roux et al., U.S. Patent Pub. No. 20050179746, entitled "Device for Controlling the Displacement of a Drop Between Two or Several Solid Substrates," published on Aug. 18, 2005; and Dhindsa et al., "Virtual Electrowetting Channels: Electronic Liquid Transport with Continuous Channel Functionality," Lab Chip, 10:832-836 (2010). Each of the above references is incorporated herein by reference in its entirety.

Certain droplet actuators will include one or more substrates arranged with a droplet-operations gap therebetween and electrodes associated with (e.g., layered on, attached to, and/or embedded in) the one or more substrates and arranged to conduct one or more droplet operations. For example, certain droplet actuators will include a base (or bottom) substrate, electrodes associated with the substrate, one or more dielectric layers atop the substrate and/or electrodes, and optionally one or more hydrophobic layers atop the substrate, dielectric layers and/or the electrodes forming a droplet-operations surface. A top substrate may also be provided, which is separated from the droplet-operations surface by a gap, which may be referred to as a droplet-operations gap. Various electrode arrangements on the top and/or bottom substrates are discussed in the incorporated patents and applications referenced above.

During droplet operations, droplets may remain in continuous contact or frequent contact with a ground or reference electrode. A ground or reference electrode may be associated with the top substrate facing the gap or the bottom substrate facing the gap, or the electrode may be located in the gap. Where electrodes are provided on both substrates, electrical contacts for coupling the electrodes to a droplet actuator instrument for controlling or monitoring the electrodes may be associated with one or both substrates. In some cases, electrodes on one substrate are electrically coupled to the other substrate so that only one substrate is in contact with the droplet actuator. In one embodiment, a conductive material (e.g., an epoxy, such as MASTER BOND™ Polymer System EP79, available from Master Bond, Inc., Hackensack, N.J.) provides the electrical connection between electrodes on one substrate and electrical paths on the other substrates, e.g., a ground electrode on a top substrate may be coupled to an electrical path on a bottom substrate by such a conductive material. Where multiple substrates are used, a spacer may be provided between the substrates to determine the height of the gap therebetween and define on-actuator dispensing reservoirs. The spacer height may, for example, be at least about 5 μm, 100 μm, 200 μm, 250 μm, 275 μm or more. Alternatively or additionally the spacer height may be at most about 600 μm, 400 μm, 350 μm, 300 μm, or less. The spacer may, for example, be formed of a layer of projections form the top or bottom substrates, and/or a material inserted between the top and bottom substrates.

One or more openings or ports may be provided in the one or more substrates for forming a liquid path through which liquid may be delivered into the droplet-operations gap. The one or more openings may in some cases be aligned for interaction with one or more electrodes, e.g., aligned such that liquid flowed through the opening will come into sufficient proximity with one or more droplet-operations electrodes to permit a droplet operation to be effected by the droplet-operations electrodes using the liquid. The openings may provide access to a receiving cavity where a reservoir of liquid may be stored. The droplet-operations electrodes may be associated with the receiving cavities for controlling the liquid.

The base (or bottom) and top substrates may in some cases be formed as one integral component. One or more reference electrodes may be provided on the base (or bottom) and/or top substrates and/or in the gap. Examples of reference electrode arrangements are provided in the above referenced patents and patent applications, which are incorporated herein by reference in their entireties.

In various embodiments, the manipulation of droplets by a droplet actuator may be electrode mediated, e.g., electrowetting-mediated or dielectrophoresis-mediated or Coulombic-force-mediated. Examples of other techniques for controlling droplet operations that may be used in the droplet actuators of the present disclosure include using devices that induce hydrodynamic fluidic pressure, such as those that operate on the basis of mechanical principles (e.g. external syringe pumps, pneumatic membrane pumps, vibrating membrane pumps, vacuum devices, centrifugal forces, piezoelectric/ultrasonic pumps and acoustic forces); electrical or magnetic principles (e.g. electroosmotic flow, electrokinetic pumps, ferrofluidic plugs, electrohydrodynamic pumps, attraction or repulsion using magnetic forces and magnetohydrodynamic pumps); thermodynamic principles (e.g. gas bubble generation/phase-change-induced volume expansion); other kinds of surface-wetting principles (e.g. electrowetting, and optoelectrowetting, as well as chemically, thermally, structurally and radioactively induced surface-tension gradients); gravity; surface tension (e.g., capillary action); electrostatic forces (e.g., electroosmotic flow); centrifugal flow (substrate disposed on a compact disc and rotated); magnetic forces (e.g., oscillating ions causes flow); magnetohydrodynamic forces; and vacuum or pressure differential. In certain embodiments, combinations of two or more of the foregoing techniques may be employed to conduct a droplet operation in a droplet actuator of the present disclosure. Similarly, one or more of the foregoing may be used to deliver liquid into a droplet-operations gap, e.g., from a reservoir in another device or from an external reservoir of the droplet actuator (e.g., a reservoir associated with a droplet actuator substrate and a flow path from the reservoir into the droplet-operations gap).

Droplet-operations surfaces of certain droplet actuators may be made from hydrophobic materials or may be coated or treated to make them hydrophobic. For example, in some cases some portion or all of the droplet-operations surfaces may be derivatized with low surface-energy materials or chemistries, e.g., by deposition or using in situ synthesis using compounds such as poly- or per-fluorinated compounds in solution or polymerizable monomers. Examples include TEFLON® AF (available from DuPont, Wilmington, Del.), members of the cytop family of materials, coatings in the FLUOROPEL® family of hydrophobic and superhydrophobic coatings (available from Cytonix Corporation, Beltsville, Md.), silane coatings, fluorosilane coatings, hydrophobic phosphonate derivatives (e.g., those sold by Aculon, Inc), and NOVEC™ electronic coatings (available from 3M Company, St. Paul, Minn.), other fluorinated monomers for plasma-enhanced chemical vapor deposition (PECVD), and organosiloxane (e.g., SiOC) for PECVD. In some cases, the droplet-operations surface may include a hydrophobic coating having a thickness ranging from about 10 nm to about 1,000 nm. Moreover, in some embodiments, the top substrate of the droplet actuator includes an electrically conducting organic polymer, which is then coated with a hydrophobic coating or otherwise treated to make the droplet-operations surface hydrophobic. For example, the electrically conducting organic polymer that is deposited onto a plastic substrate may be poly(3,4-ethylenedioxythiophene)poly(styrenesulfonate) (PEDOT:PSS). Other examples of electrically conducting organic polymers and alternative conductive layers are described in Pollack et al., International Patent Pub. No. WO/2011/002957, entitled "Droplet Actuator Devices and Methods," published on Jan. 6, 2011, the entire disclosure of which is incorporated herein by reference.

One or both substrates may be fabricated using a printed circuit board (PCB), glass, indium tin oxide (ITO)-coated glass, and/or semiconductor materials as the substrate. When the substrate is ITO-coated glass, the ITO coating may have a thickness of at least about 20 nm, 50 nm, 75 nm, 100 nm or more. Alternatively or additionally, the thickness can be at most about 200 nm, 150 nm, 125 nm or less. In some cases, the top and/or bottom substrate includes a PCB substrate that is coated with a dielectric, such as a polyimide dielectric, which may in some cases also be coated or otherwise treated to make the droplet-operations surface hydrophobic. When the substrate includes a PCB, the following materials are examples of suitable materials: MITSUI™ BN-300 (available from MITSUI Chemicals America, Inc., San Jose Calif.); ARLON™ 11N (available from Arlon, Inc, Santa Ana, Calif.).; NELCO® N4000-6 and N5000-30/32 (available from Park Electrochemical Corp., Melville, N.Y.); ISOLA™ FR406 (available from Isola Group, Chandler, Ariz.), especially IS620; fluoropolymer family (suitable for fluorescence detection since it has low background fluorescence); polyimide family; polyester; polyethylene naphthalate; polycarbonate; polyetheretherketone; liquid crystal polymer; cyclo-olefin copolymer (COC); cyclo-olefin polymer (COP); aramid; THERMOUNT® nonwoven aramid reinforcement (available from DuPont, Wilmington, Del.); NOMEX® brand fiber (available from DuPont, Wilmington, Del.); and paper. Various materials are also suitable for use as the dielectric component of the substrate. Examples include: vapor deposited dielectric, such as PARYLENE™ C (especially on glass), PARYLENE™ N, and PARYLENE™ HT (for high temperature, ~300° C.) (available from Parylene Coating Services, Inc., Katy, Tex.); TEFLON® AF coatings; cytop; soldermasks, such as liquid photoimageable soldermasks (e.g., on PCB) like TAIYO™ PSR4000 series, TAIYO™ PSR and AUS series (available from Taiyo America, Inc. Carson City, Nev.) (good thermal characteristics for applications involving thermal control), and PROBIMER™ 8165 (good thermal characteristics for applications involving thermal control (available from Huntsman Advanced Materials Americas Inc., Los Angeles, Calif.); dry film soldermask, such as those in the VACREL® dry film soldermask line (available from DuPont, Wilmington, Del.); film dielectrics, such as polyimide film (e.g., KAPTON® polyimide film, available from DuPont, Wilmington, Del.), polyethylene, and fluoropolymers (e.g., FEP), polytetrafluoroethylene; polyester; polyethylene naphthalate; cyclo-olefin copolymer (COC); cyclo-olefin polymer (COP); any other PCB substrate material listed above; black matrix resin; polypropylene; and black flexible circuit materials, such as DuPont™ Pyralux® HXC and DuPont™ Kapton® MBC (available from DuPont, Wilmington, Del.). Droplet transport voltage and frequency may be selected for performance with reagents used in specific assay protocols. Design parameters may be varied, e.g., number and placement of on-actuator reservoirs, number of independent electrode connections, size (volume) of different reservoirs, placement of magnets/bead washing zones, electrode size, inter-electrode pitch, and gap height (between top and bottom substrates) may be varied for use with specific reagents, protocols, droplet volumes, etc. In some cases, a substrate of the present disclosure may be derivatized with low surface-energy materials or chemistries, e.g., using deposition or in situ synthesis using poly- or per-fluorinated compounds in solution or polymerizable monomers. Examples include TEFLON® AF coatings and FLUOROPEL® coatings for dip or spray coating, other fluorinated monomers for plasma-enhanced chemical vapor deposition (PECVD), and organosiloxane (e.g., SiOC) for PECVD. Additionally, in some cases, some portion or all of the droplet-operations surface may be coated with a substance for reducing background noise, such as background fluorescence from a PCB substrate. For example, the noise-reducing coating may include a black matrix resin, such as the black matrix resins available from Toray industries, Inc., Japan.

Reagents may be provided on the droplet actuator in the droplet-operations gap or in a reservoir fluidly coupled to the droplet-operations gap. The reagents may be in liquid form, e.g., droplets, or they may be provided in a reconstitutable form in the droplet-operations gap or in a reservoir fluidly coupled to the droplet-operations gap. Reconstitutable reagents may typically be combined with liquids for reconstitution. An example of reconstitutable reagents suitable for use with the methods and apparatus set forth herein includes those described in Meathrel et al., U.S. Pat. No. 7,727,466, entitled "Disintegratable Films for Diagnostic Devices," issued on Jun. 1, 2010, the entire disclosure of which is incorporated herein by reference.

As used herein, the term "activate" when used with reference to one or more electrodes, means affecting a change in the electrical state of the one or more electrodes which, in the presence of a droplet, may result in a droplet operation. Activation of an electrode can be accomplished using alternating current (AC) or direct current (DC). Any suitable voltage may be used. For example, an electrode may be activated using a voltage which is greater than about 150 V, or greater than about 200 V, or greater than about 250 V, or from about 275 V to about 1000 V, or about 300 V. Where an AC signal is used, any suitable frequency may be employed. For example, an electrode may be activated using an AC signal having a frequency from about 1 Hz to about 10 MHz, or from about 10 Hz to about 60 Hz, or from about 20 Hz to about 40 Hz, or about 30 Hz. Electrodes of a droplet actuator may be controlled by a controller or a processor, which may be provided as part of an assay system. The controller or processor may include processing functions as well as data and software storage and input and output capabilities.

As used herein, a "droplet operation" includes any manipulation of a droplet on or within a droplet actuator. A droplet operation may, for example, include: loading a droplet into the droplet actuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a droplet actuator; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading.

Droplet operations may be electrode-mediated. In some cases, droplet operations are further facilitated by the use of hydrophilic and/or hydrophobic regions on surfaces and/or by physical obstacles. For examples of droplet operations, see the patents and patent applications cited above under the definition of "droplet actuator."

Impedance or capacitance sensing or imaging techniques may sometimes be used to determine or confirm the outcome of a droplet operation or to determine or confirm a volume or level of liquid within a receiving cavity or well. Examples of such techniques are described in Sturmer et al., International Patent Pub. No. WO/2008/101194, entitled "Capacitance Detection in a Droplet Actuator," published on Dec. 30, 2009, the entire disclosure of which is incorporated herein by reference. Generally speaking, the sensing or imaging techniques may be used to confirm the presence or absence of a droplet at a specific electrode or within a well or receiving cavity. For example, the presence of a dispensed droplet at the destination electrode following a droplet dispensing operation confirms that the droplet dispensing operation was effective. Similarly, the presence of a droplet at a detection spot at an appropriate step in an assay protocol may confirm that a previous set of droplet operations has successfully produced a droplet for detection.

Droplet transport time can be quite fast. For example, in various embodiments, transport of a droplet from one electrode to the next may exceed about 1 sec, or about 0.1 sec, or about 0.01 sec, or about 0.001 sec. In one embodiment, the electrode is operated in AC mode but is switched to DC mode for imaging. It is helpful for conducting droplet operations for the footprint area of droplet to be similar to electrowetting area; in other words, 1x-, 2x- 3x-droplets are usefully controlled operated using 1, 2, and 3 electrodes, respectively. If the droplet footprint is greater than number of electrodes available for conducting a droplet operation at a given time, the difference between the droplet size and the number of electrodes should typically not be greater than 1; in other words, a 2x droplet is usefully controlled using 1 electrode and a 3x droplet is usefully controlled using 2 electrodes. When droplets include beads, it is useful for droplet size to be equal to the number of electrodes controlling the droplet, e.g., transporting the droplet.

As used herein, a "filler liquid" includes a liquid associated with a droplet-operations substrate of a droplet actuator, which liquid is sufficiently immiscible with a droplet phase to render the droplet phase subject to electrode-mediated droplet operations. For example, the droplet-operations gap of a droplet actuator is typically filled with a filler liquid. The filler liquid may be a non-polar liquid. The filler liquid may, for example, be or include a low-viscosity oil, such as silicone oil or hexadecane filler liquid. The filler liquid may be or include a halogenated oil, such as a fluorinated or perfluorinated oil. The filler liquid may fill the entire gap of the droplet actuator or may coat one or more surfaces of the droplet actuator. Filler liquids may be conductive or non-conductive. Filler liquids may be selected to improve droplet operations and/or reduce loss of reagent or target substances from droplets, improve formation of microdroplets, reduce cross contamination between droplets, reduce contamination of droplet actuator surfaces, reduce degradation of droplet actuator materials, etc. For example, filler liquids may be selected for compatibility with droplet actuator materials. As an example, fluorinated filler liquids may be usefully employed with fluorinated surface coatings. Fluorinated filler liquids are useful to reduce loss of lipophilic compounds, such as umbelliferone substrates like 6-hexadecanoylamido-4-methylumbelliferone substrates (e.g., for use in Krabbe, Niemann-Pick, or other assays); other umbelliferone substrates are described in Winger et al., U.S. Patent Pub. No. 20110118132, entitled "Enzymatic Assays Using Umbelliferone Substrates with Cyclodextrins in Droplets of Oil," published on May 19, 2011, the entire disclosure of which is incorporated herein by reference. Examples of suitable fluorinated oils include those in the Galden line, such as Galden HT170 (bp=170° C., viscosity=1.8 cSt, density=1.77), Galden HT200 (bp=200 C, viscosity=2.4 cSt, d=1.79), Galden HT230 (bp=230 C, viscosity=4.4 cSt, d=1.82) (all from Solvay Solexis); those in the Novec line, such as Novec 7500 (bp=128 C, viscosity=0.8 cSt, d=1.61), Fluorinert FC-40 (bp=155° C., viscosity=1.8 cSt, d=1.85), Fluorinert FC-43 (bp=174° C., viscosity=2.5 cSt, d=1.86) (both from 3M). In general, selection of perfluorinated filler liquids is based on kinematic viscosity (<7 cSt, but not required), and on boiling point (>150° C., but not required, for use in DNA/RNA-based applications (PCR, etc.)). Filler liquids may, for example, be doped with surfactants or other additives. For example, additives may be selected to improve droplet operations and/or reduce loss of reagent or target substances from droplets, formation of microdroplets, cross contamination between droplets, contamination of droplet actuator surfaces, degradation of droplet actuator materials, etc. Composition of the filler liquid, including surfactant doping, may be selected for performance with reagents used in the specific assay protocols and effective interaction or non-interaction with droplet actuator materials. Examples of filler liquids and filler liquid formulations suitable for use with the methods and apparatus set forth herein are provided in Srinivasan et al, International Patent Pub. No. WO/2010/027894, entitled "Droplet Actuators, Modified Fluids and Methods," published on Jun. 3, 2010; Srinivasan et al, International Patent Pub. No. WO/2009/021173, entitled "Use of Additives for Enhancing Droplet Operations," published on Feb. 12, 2009; Sista et al., International Patent Pub. No. WO/2008/098236, entitled "Droplet Actuator Devices and Methods Employing Magnetic Beads," published on Jan. 15, 2009; and Monroe et al., U.S. Patent Pub. No. 20080283414, entitled "Electrowetting Devices," published on Nov. 20, 2008, the entire disclosures of which are incorporated herein by reference, as well as the other patents and patent applications cited herein. Fluorinated oils may in some cases be doped with fluorinated surfactants, e.g., Zonyl FSO-100 (Sigma-Aldrich) and/or others. A filler liquid is typically a liquid. In some embodiments, a filler gas can be used instead of a liquid.

As used herein, a "reservoir" means an enclosure or partial enclosure configured for holding, storing, or supplying liquid. An assay system, a fluidic system, or a droplet actuator may include reservoirs. On-cartridge reservoirs may be (1) on-actuator reservoirs, which are reservoirs in the droplet-operations gap or on the droplet-operations surface; (2) off-actuator reservoirs, which are reservoirs on the droplet actuator cartridge, but outside the droplet-operations gap, and not in contact with the droplet-operations surface; or (3) hybrid reservoirs which have on-actuator regions and off-actuator regions. example of an off-actuator reservoir is a reservoir in the top substrate. In some embodiments, receiving cavities are on-cartridge reservoirs or off-cartridge reservoirs. An off-actuator reservoir may also be an assay reservoir as described herein. An off-actuator reservoir is typically in flow communication with an opening or flow path arranged for flowing liquid from the off-actuator reservoir into the droplet-operations gap, such as into an on-actuator reservoir. An off-cartridge reservoir may be a reservoir that is not part of the droplet actuator cartridge at all, but which flows liquid to some portion of the droplet actuator cartridge. For example, an off-cartridge reservoir may be part of a system or docking station to which the droplet actuator cartridge is coupled during operation. Similarly, an off-cartridge reservoir may be a reagent storage container or syringe which is used to force liquid into an on-cartridge reservoir or into a droplet-operations gap. A system using an off-cartridge reservoir will typically include a liquid passage means whereby liquid may be transferred from the off-cartridge reservoir into an on-cartridge reservoir or into a droplet-operations gap.

When a liquid in any form (e.g., a droplet or a continuous body, whether moving or stationary) is described as being "on", "at", or "over" an electrode, array, matrix or surface, such liquid could be either in direct contact with the electrode/array/matrix/surface, or could be in contact with one or more layers or films that are interposed between the liquid and the electrode/array/matrix/surface. In one example, filler liquid can be considered as a film between such liquid and the electrode/array/matrix/surface.

When a droplet is described as being "on" or "loaded on" a droplet actuator, it should be understood that the droplet is arranged on or within the droplet actuator in a manner which facilitates using the droplet actuator to conduct one or more droplet operations or in a manner which facilitates sensing of a property of or a signal from the droplet.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

FIG. 1 is a block diagram of an assay system 100 configured to conduct designated reactions formed in accordance with an embodiment. The assay system 100 includes a fluidic system 102 that is operably positioned with respect to or operably coupled to a liquid-transport assembly 104, a detector assembly 106, a liquid-detection system 108, and one or more heating devices 110. The fluidic system 102 may be a droplet actuator, such as a DF device or cartridge, that is configured to utilize DF technology to conduct droplet operations on discrete droplets. For example, alternative fluidic systems may include flow cells in which one or more liquids continuously flow through the flow cell. Fluidic systems may also include MEMS, LOC, and/or POC devices. It is noted that the terms DF device, flow cell, MEMS device, LOC device, and POC device are not necessarily mutually exclusive. For example, a single fluidic system may be characterized as a MEMS device, a LOC device, and/or a POC device.

In certain embodiments, the fluidic system 102 is a droplet actuator that includes a first substrate and a second substrate that are separated by a droplet-operations gap (not shown). The droplet-operations gap may define an interior cavity where the droplets are located during operation of the fluidic system 102. The first substrate may include an arrangement of electrically addressable electrodes. In some cases, the second substrate may include a reference electrode plane made, for example, from conductive ink or indium tin oxide (ITO). The first substrate and the second substrate may be coated with a hydrophobic material. Droplet operations are conducted in the droplet-operations gap. The space around the droplets (i.e., the droplet-operations gap between first and second substrates) may be filled with a filler liquid that is immiscible with respect to the droplets. For example, the filler liquid may be an inert fluid, such as silicone oil, that prevents evaporation of the droplets and is used to facilitate their transport within the device. In some cases, droplet operations may be effected by varying the patterns of voltage activation. Droplet operations may include merging, splitting, mixing, and dispensing of droplets.

The fluidic system 102 may be designed to fit onto or within a system housing (not shown) of the assay system 100. The system housing may hold the fluidic system 102 and house other components of the assay system, such as, but not limited to, the liquid-transport assembly 104, the detector assembly 106, the liquid-detection system 108, and one or more heating devices 110. For example, the system housing may house one or more magnets 112, which may be permanent magnets. Optionally, the system housing may house one or more electromagnets 114. The magnets 112 and/or electromagnets 114 may be positioned in relation to the fluidic system 102 for immobilization of magnetically responsive beads. Optionally, the positions of the magnets 112 and/or the electromagnets 114 may be controlled by a magnet-locating motor 116. Additionally, the system housing may house one or more of the heating devices 110 for controlling the temperature within, for example, certain reaction and/or washing zones of the fluidic system 102. In one example, the heating devices 110 may be heater bars that are positioned in relation to the fluidic system 102 for providing thermal control thereof.

The assay system 100 may include a system controller 120 that communicates with the various components of the assay system 100 for automatically controlling the assay system 100 during one or more protocols. For example, the system controller 120 may be communicatively coupled to the fluidic system 102, the electromagnets 114, the magnet-locating motor 116, the heating devices 110, the detector assembly 106, the liquid-detection system 108, and the liquid-transport assembly 104. The system controller 120 may also be communicatively coupled to a user interface (not shown) that is configured to receive user inputs for operating the assay system 100.

The system controller 120 may include one or more logic-based devices, including one or more microcontrollers, processors, reduced instruction set computers (RISC), application specific integrated circuits (ASICs), field programmable gate array (FPGAs), logic circuits, and any other circuitry capable of executing functions described herein. In an exemplary embodiment, the system controller 120 executes a set of instructions that are stored in one or more circuitry modules in order to perform one or more protocols. Storage elements may be in the form of information sources or physical memory elements within the assay system 100. The protocols performed by the assay system 100 may be to carry out, for example, quantitative analysis of DNA or RNA, protein analysis, DNA sequencing (e.g., sequencing-by-synthesis (SBS)), sample preparation, and/or preparation of fragment libraries for sequencing. For embodiments that utilize a droplet actuator, the system controller 120 may control droplet manipulation by activating/deactivating electrodes to perform one or more of the protocols. The system controller 120 may also control operation and positioning of the liquid-transport assembly 104 as described herein.

The set of instructions may include various commands that instruct the assay system 100 to perform specific operations such as the methods and processes of the various embodiments described herein. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The software may be in various forms such as system software or application software. Further, the software may be in the form of a collection of separate programs, or a program module within a larger program or a portion of a program module. The software also may include modular programming in the form of object-oriented programming. After obtaining the detection data, the detection data may be automatically processed by the assay system 100, processed in response to user inputs, or processed in response to a request made by another processing machine (e.g., a remote request through a communication link).

The system controller 120 may be connected to the other components or sub-systems of the assay system 100 via communication links, which may be hardwired or wireless. The system controller 120 may also be communicatively connected to off-site systems or servers. The system controller 120 may receive user inputs or commands, from a user interface (not shown). The user interface may include a keyboard, mouse, a touch-screen panel, and/or a voice recognition system, and the like.

The system controller 120 may serve to provide processing capabilities, such as storing, interpreting, and/or executing software instructions, as well as controlling the overall operation of the assay system 100. The system controller 120 may be configured and programmed to control data and/or power aspects of the various components. Although the system controller 120 is represented as a single structure in FIG. 1, it is understood that the system controller 120 may include multiple separate components (e.g., processors) that are distributed throughout the assay system 100 at different locations. In some embodiment, one or more components may be integrated with a base instrument and one or more components may be located remotely with respect to the instrument.

In some embodiments, the detector assembly 106 is an imaging system that is positioned in relation to the fluidic system 102 to detect light signals (e.g., absorbance, reflection/refraction, or light emissions) from the fluidic system 102. The imaging system may include one or more light sources (e.g., light-emitting diodes (LEDs) and a detection device, such as a charge-coupled device (CCD) camera or complementary-metal-oxide semiconductor (CMOS) imager. In some embodiments, the detector assembly 106 may detect light signals that are emitted from chemilluminescence. Yet still in other embodiments, the detector assembly 106 may not be an imaging system. For example, the detector assembly 106 may be one or more electrodes that detect an electrical property of a liquid.

The liquid-detection system 108 may be configured to detect a location of a liquid and/or a volume of the liquid. For instance, the liquid-detection 108 may be configured to identify a location of a droplet within the fluidic system 102 and/or a volume of a droplet within the fluidic system 102 or of a liquid within a reservoir (or receiving cavity). In certain embodiments, the liquid-detection system 108 may include circuitry for detecting impedance within a droplet or reservoir. For example, the liquid-detection system 108 may include electrodes that form an impedance spectrometer. The liquid-detection system 108 may be used to monitor the capacitive loading of any electrode, such as any droplet-operations electrode, with or without a droplet thereon. For examples of suitable capacitance detection techniques, see Sturmer et al., International Patent Publication No. WO/2008/101194, entitled "Capacitance Detection in a Droplet Actuator," published on Aug. 21, 2008; and Kale et al., International Patent Publication No. WO/2002/080822, entitled "System and Method for Dispensing Liquids," published on Oct. 17, 2002; the entire disclosures of which are incorporated herein by reference. Alternatively, other devices or elements may be used to detect a location and/or volume of the liquid within the fluidic system 102. For instance, the detector assembly 106 may detect light signals that propagate through and/or are emitted from a designated region. Based on the light signals, the liquid-detection system 108 may confirm whether a droplet is located at the designated region and/or determine that a liquid has an approximate volume at the designated region. The liquid-detection system 108 may include probes that detect a level of the liquid.

Optionally, the fluidic system 102 may include a disruption device 122. The disruption device 122 may include any device that promotes disruption (lysis) of materials, such as tissues, cells and spores in a droplet actuator. The disruption device 122 may, for example, be a sonication mechanism, a heating mechanism, a mechanical shearing mechanism, a bead beating mechanism, physical features incorporated into the fluidic system 102, an electric field generating mechanism, a thermal cycling mechanism, and any combinations thereof. The disruption device 122 may be controlled by the system controller 120.

The liquid-transport assembly 104 may include a storage housing 115 and a transport motor 117. The storage housing 115 includes a reservoir or cavity that is configured to store liquids (e.g., reagents, buffer solutions, filler liquid, etc.) that are used to conduct the designated reactions. The transport motor 117 is configured to move the storage housing 115 relative to the fluidic system 102 to load liquids into and/or remove liquids from the fluidic system 102. The liquids may be loaded into or drawn through openings or ports 129 that provide access to an interior cavity of the fluidic system 102. By way of example only, the transport motor 117 (and the magnet-locating motor 116) may include one or more direct drive motors, direct current (DC) motors, solenoid drivers, linear actuators, piezoelectric motors, and the like.

It will be appreciated that one or more aspects of the embodiments set forth herein may be embodied as a method, system, computer readable medium, and/or computer program product. The term “system” is to be interpreted broadly and may mean any assembly or device. Aspects may take the form of hardware embodiments, software embodiments (including firmware, resident software, micro-code, etc.), or embodiments combining software and hardware aspects that may all generally be referred to herein as a “circuit,” “module” or “system.” Furthermore, the methods may take the form of a computer program product on a computer-usable storage medium having computer-usable program code embodied in the medium.

Figure 2:
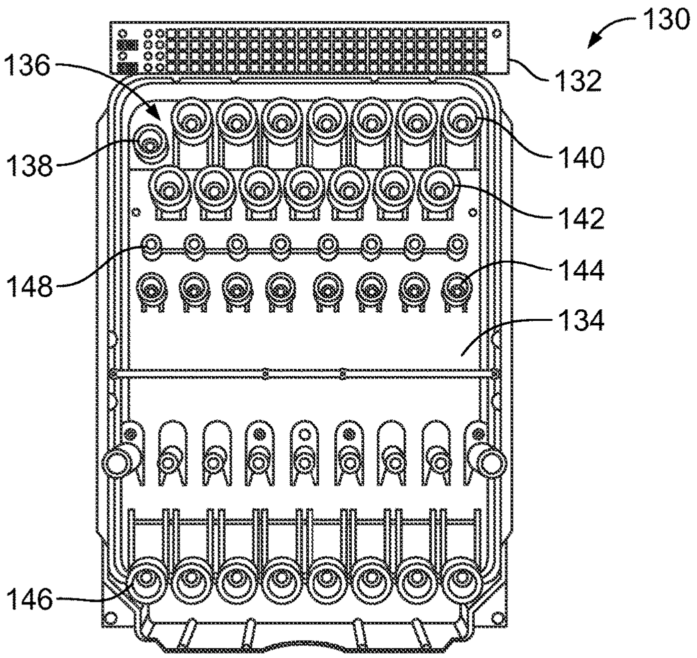
FIG. 2 is an image illustrating a plan view of a fluidic system that may be used with the system of FIG. 1.

FIG. 2 is an image illustrating a plan view of a droplet actuator 130, which may be used as the fluidic system with an assay system, such as the assay system 100 (FIG. 1). The droplet actuator 130 includes a bottom substrate 132 and a top substrate 134 that is positioned over the bottom substrate 132. The bottom substrate 132 may include, for example, a printed circuit board (PCB) having an array of electrodes thereon for conducting droplet operations. The top substrate 134 may be a cover plate that is mounted over the bottom substrate 132. The top substrate 134 includes an array of openings 136. For example, in the illustrated embodiment, the openings 136 include a filler inlet 138, rows of reagent inlets 140, 142, a row of adaptor inlets 144, a row of sample inlets 146, and a row of sample outlets 148. Each of the openings 136 provides fluidic access to an interior cavity (or droplets-operation gap) that is located between the top and bottom substrates 134, 132. As described in greater detail below, one or more of the openings 136 may be fluidically coupled to a liquid-transport assembly. The droplet actuator 130 may receive liquids (e.g., one or more reagents, buffer solutions, filler liquid, and the like) through the openings 136 and/or may have liquids withdrawn through the openings 136.

Figure 3:
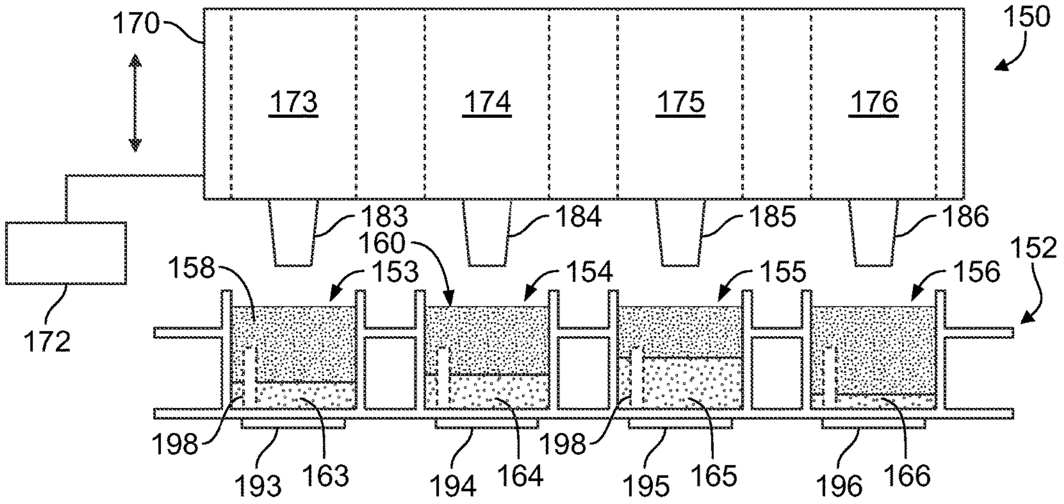
FIG. 3 is a schematic cross-section of a liquid-exchange assembly that is configured to load liquids into or remove liquids from a fluidic system that may be used with the assay system of FIG. 1.

FIG. 3 is a schematic cross-section of a liquid-transport assembly 150 positioned relative to a fluidic system 152. The liquid-transport assembly 150 and the fluidic system 152 may be components of an assay system, such as the assay system 100 (FIG. 1). The fluidic system 152 includes a system housing or body 151 that may define an interior cavity (not shown) that includes or is fluidically coupled to a plurality of receiving cavities 153-156. The system housing 151 may include one or more components, such as one or more substrates, and define various spaces within the interior cavity of the system housing 151. For example, the system housing 151 may include first and second substrates that are stacked with respect to each other and define a plurality of channels and reservoirs therebetween. The receiving cavities 153-156 are configured to receive a filler liquid 158 and respective aqueous liquids 163-166. The receiving cavities 153-156 function as reservoirs that receive and store the respective aqueous liquids 163-166. As shown, each of the receiving cavities 153-156 has an opening or port that opens to an exterior of the fluidic system 152. The openings provide fluidic access to the receiving cavities 153-156 so that liquids may be loaded therein.

The filler liquid 158 is immiscible with respect to the aqueous liquids 163-166. Although the receiving cavities 153-156 are shown as being separate cavities, the receiving cavities 153-156 are portions of a common larger interior cavity of the fluidic system 152 in the illustrated embodiment. As such, the filler liquid 158 may have a common fill level 160 in each of the receiving cavities 153-156 despite the aqueous liquids 163-166 having different volumes in the respective receiving cavities 153-156.

As shown, the liquid-transport assembly 150 includes a storage housing 170 having a plurality of assay reservoirs 173-176 and a plurality of flow ports 183-186. In the illustrated embodiments, the flow ports 183-186 are outlet ports because liquid is loaded into the fluidic system 152 through the flow ports 183-186. The liquid-transport assembly 150 may also include a transport motor 172 that is operably coupled to the storage housing 170. The transport motor 172 may be configured to selectively move the storage housing 170 bi-directionally to and from the fluidic system 152. In some embodiments, the transport motor 172 may also move the storage housing 170 in a lateral direction, such as along the page in FIG. 3 or into and out of the page in FIG. 3.

In some embodiments, the storage housing 170 may constitute a single-use cartridge that is discarded after the contents of the storage housing 170 are deposited into the fluidic system 152. In alternative embodiments, the storage housing 170 is not discarded and, instead, may be re-fillable. The flow ports 183-186 are configured to fluidically couple the assay reservoirs 173-176 and the receiving cavities 153-156, respectively. In the illustrated embodiment, the flow ports 183-186 are elongated nozzles, but the flow ports 183-186 may have other shapes and dimensions in other embodiments. Each of the assay reservoirs 173-176 is configured to hold the corresponding aqueous liquids 163-166. In some embodiments, the aqueous liquids 163-166 held by the respective assay reservoirs 173-176 are different, but one or more of the aqueous liquids 163-166 may be the same in other embodiments. For example, the aqueous liquids 163 and 166 may be the same reagent.

In FIG. 3, the fill level 160 is the same in each of the receiving cavities 153-156, but a level of the corresponding aqueous liquids 163-166 is different in the respective receiving cavities 153-156. As shown, the aqueous liquid 166 is lowest, followed by the aqueous liquid 163, the aqueous liquid 164, and the aqueous liquid 165. The level (or volume) of the aqueous liquids 163-166 may be determined by electrodes 193-196, which are associated with the receiving cavities 153-156, respectively. More specifically, the electrodes 193-196 are positioned directly under the aqueous liquids 163-166, respectively. Although each of the electrodes 193-196 is illustrated as a single electrode, it is understood that multiple electrodes may be associated with each receiving cavity. For instance, each receiving cavity 153-156 may be associated with an array of electrodes.

In some embodiments, the electrodes 193-196 are configured to detect a capacitance of the liquid within the corresponding receiving cavity. The liquid may be the aqueous liquid or the filler liquid. The capacitance may be based on a volume of the corresponding liquid. The capacitance may also be based on other parameters, such as a composition of the corresponding liquid. As such, a liquid-detection system, such as the liquid-detection system 108 (FIG. 1), may determine a volume or level of the liquids within the receiving cavities based on the corresponding capacitance values detected by the electrodes.

In other embodiments, the receiving cavities 153-156 may include liquid sensors or transducers 198. The liquid sensors may extend into and directly contact the aqueous liquid and/or the filler liquid. Each of the liquid sensors 198 may be configured to measure (e.g., detect) a designated property or characteristic in the liquid proximate to the sensor and provide a signal that is representative of the measured property or characteristic. The signal provided by the liquid sensor 198 may be the measurement. Various types of measurements may be obtained by the liquid sensors 198. Some non-limiting examples include a capacitance of the liquid, a temperature of the liquid, a fluid conduction of the liquid, a dielectric constant of the liquid, a dissipation factor of the liquid, an impedance of the liquid, or a viscosity of the liquid. A measurement may be directly obtained (e.g., temperature) by the liquid sensor 198, or a designated measurement may be obtained after using information provided by the liquid sensor 198 to calculate the designated measurement. In particular embodiments, the liquid sensors 198 detect a capacitance of the aqueous liquid within the receiving cavity to determine the volume of the aqueous liquid within the receiving cavity.

The liquid-transport assembly 150 may be configured to selectively load the aqueous liquids 163-166 into the receiving cavities 153-156, respectively. During operation of the assay system, droplets of the aqueous liquids 163-166 are removed from the receiving cavities 153-156, respectively, and directed toward other regions of the interior cavity. As droplets of the aqueous liquids 163-166 are removed from the receiving cavities 153-156, the volumes of the aqueous liquids 163-166 decrease. The liquid-detection system may continuously or periodically detect the level of the aqueous liquids 163-166. After the liquid-detection system determines that one or more of the aqueous liquids 163-166 is below a designated level or volume, the liquid-transport assembly 150 may load the corresponding aqueous liquids into the respective receiving cavities. For example, with respect to FIG. 3, the liquid-detection system may determine that the aqueous liquids 163 and 166 are below designated volumes.

Accordingly, the liquid-transport assembly 150 may actively or passively provide the aqueous liquids 163, 166 into the receiving cavities 153, 156. Methods and mechanisms for providing the aqueous liquids are described in greater detail below. For example, the liquid-transport assembly 150 may be similar or identical to the liquid-transport assemblies 200, 250, 300, 350, 400, 450, and 500. Likewise, the fluidic system 152 may be similar or identical to the other fluidic systems set forth herein.

Figure 4:
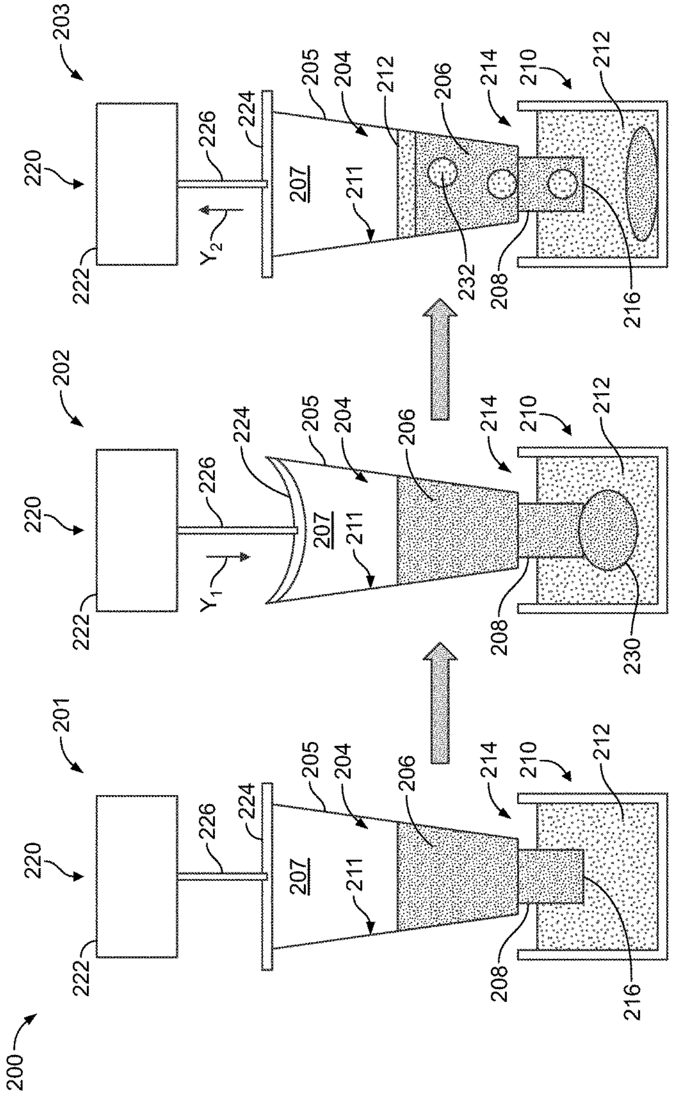
FIG. 4 is a schematic cross-section of a liquid-exchange assembly at different operating stages that may be used by the system of FIG. 1 in accordance with an embodiment to load liquid into a fluidic system.

FIG. 4 is a schematic cross-section of a liquid-transport assembly 200 at different operating stages 201-203. The liquid-transport assembly 200 may be used with the assay system 100 (FIG. 1). The liquid-transport assembly 200 is configured to exchange immiscible liquids and, as such, is hereinafter referred to as the liquid-exchange assembly 200. The liquid-exchange assembly 200 may include a storage housing 205 having an interior surface 211 that defines an assay reservoir 204 for holding a first liquid 206. In some embodiments, the assay reservoir 204 may also include a gas 207, which may be ambient air, a designated gas, or mixture of gases. In other embodiments, the assay reservoir may be essentially free of gas.

The storage housing 205 includes an exchange port 208, which is illustrated as a nozzle in FIG. 4. The exchange port 208 represents a portion of the storage housing 205 that includes an opening through which liquids may flow. In some embodiments, the assay reservoir 204 is effectively sealed such that fluids (e.g., liquid and gas) may only enter or exit the assay reservoir 204 through the exchange port 208. The liquid-exchange assembly 200 also includes a receiving cavity 210 for holding a second liquid 212 that is immiscible with respect to the liquid 206. The receiving cavity 210 may be part of a fluidic system (not shown), such as the fluidic system 102 (FIG. 1), the droplet actuator 130 (FIG. 2), or the fluidic system 152 (FIG. 3). In the illustrated embodiment, the first liquid 206 is an aqueous liquid, such as a reagent or buffer solution, and the second liquid 212 is a filler liquid, such as oil. The receiving cavity 210 includes an opening or port 214, which may be similar to the openings 129 (FIG. 1) of the fluidic system 102 or the openings 136 (FIG. 2) of the droplet actuator 130. As shown, the exchange port 208 is configured to extend through the opening 214 and fluidically couple the assay reservoir 204 and the receiving cavity 210. More specifically, the exchange port 208 may be a nozzle having a port end 216 that is submerged within the liquid 212.

The liquid-exchange assembly 200 also includes a pressure activator 220 that is operably coupled to the storage housing 205 and the assay reservoir 204. The pressure activator 220 is configured to generate a displacement force for moving the liquid 206 out of the assay reservoir 204 and a suction force for drawing the liquid 212 into the assay reservoir 204. In the illustrated embodiment, the pressure activator 220 includes an actuator 222, a plunger 224 that is coupled to the storage housing 205, and a link 226 that operably connects the actuator 222 and the plunger 224. The link 226 may be, for example, a piston. The actuator 222 may be a motor that is configured to drive the link 226 thereby moving the plunger 224. The plunger 224 may be moved between, at least, first and second positions. The first position is shown with respect to the operating stage 202, and the second position is shown with respect to the operating stage 203 and, optionally, the operating stage 201.

At the operating stage 201, the liquid 206 and the liquid 212 are held in equilibrium. For example, neither of the liquids 206, 212 flows through the exchange port 208 during the operating stage 201. During the operating stage 202, the plunger 224 is driven by the actuator 222 and the link 226 to the first position. The plunger 224 moves in a first direction $Y_1$ to the first position. In the illustrated embodiment, the plunger 224 is driven in a direction toward the liquid 206 or toward the receiving cavity 212. As the plunger 224 is driven to the first position, the plunger 224 displaces the gas 207 and, consequently, the liquid 206 thereby forcing the liquid 206 through the exchange port 208 and into the receiving cavity 210.

As shown in FIG. 4 at operating stage 202, as the liquid 206 exits the exchange port 208, the liquid 206 may form a droplet 230. More specifically, the cohesive forces of the aqueous liquid 206 and/or the liquid-liquid interfacial tension between the liquids 206, 212 cause molecules of the aqueous liquid 206 to group together and form one or more droplets 230 within the non-polar liquid 212. Because the liquids 206, 212 are immiscible and have different densities, each droplet 230 is pulled by the force of gravity to a bottom of the receiving cavity 210. By way of example, the liquid 206 may form at least one droplet 230 within the receiving cavity 210 for each operating stage 202. The size and/or amount of droplets 230 may be based on a volume displaced by the plunger 224. As the droplet 230 increases in size, the droplet 230 may begin to form and sink toward the bottom of the receiving cavity 210. As the droplet 230 sinks, the liquid 212 may flow into a space that was previously occupied by the droplet 230 proximate to the port end 216. More specifically, the liquid 212 may cover the port end 216 after the droplet 230 moves away from the port end 216.

In the illustrated embodiment, the port end 216 faces in a direction that is parallel to the force of gravity. In other embodiments, the port end 216 may face in a non-parallel direction. For example, the port end 216 may face in a horizontal direction or face in a non-orthogonal direction that is upward or downward with respect to gravity. In some embodiments, any direction may be used provided that the droplet 230 moves away from the port end 216 and that space is subsequently occupied by the liquid 212.

During the operating stage 203, the plunger 224 is retracted by the actuator 222 to a second position. The second position may be the position of the plunger 224 when the liquids 206, 212 are held in equilibrium. When moving from the first position to the second position, the plunger 224 moves in a second direction $Y_2$ that is opposite the first direction $Y_1$. As the plunger 224 moves to the second position, the plunger 224 generates a negative pressure or suction force. The negative pressure draws the gas 207 and, consequently, the liquid 206 away from the port end 216. With the liquid 212 occupying the space proximate to the port end 216 within the receiving cavity 210, the suction force draws a volume of the liquid 212 through the exchange port 208 and into the assay reservoir 204. The volume of the liquid 212 may form one or more droplets 232, caused by the liquid-liquid interfacial tension between the liquids 206, 212. Due to the different densities of the liquids 206, 212, the droplets 232 may rise within the assay reservoir 204. As the droplet(s) 232 rise within the assay reservoir 204, the liquid 206 fills the space that is proximate to the port end 216 within the assay reservoir 204. As such, the liquid 206 is primed for being displaced into the receiving cavity 210 in a subsequent cycle of the operating stages 201-203. After the operating stage 203, the liquids 206, 212 may again be in equilibrium.

Although not shown, the receiving cavity 210 may be fluidically coupled to an interior cavity of a fluidic system. During operation of the assay system, the liquid 206 may be directed away from the receiving cavity 210 into the fluidic system to conduct designated reactions. For embodiments in which the fluidic system is a droplet actuator, electrodes of the droplet actuator may form droplets (not shown) of the liquid 206 within the receiving cavity 210 and direct the droplets away from the receiving cavity 210 toward designated regions of the droplet actuator.

The liquid-exchange assembly 200 is configured to cycle through the operating stages 201-203 to load the liquid 206 and to remove the liquid 212. Accordingly, the pressure activator 220 may be configured to repeatedly exchange the liquids 206, 212 by (a) driving (or, alternatively, drawing) a designated volume of the liquid 206 (e.g., the droplet(s) 230) through the exchange port 208 into the receiving cavity 210 and (b) drawing (or, alternatively, driving) a designated volume of the liquid 212 (e.g., the droplet(s) 232) through the exchange port 208 into the assay reservoir 204. After each exchange of the liquids 206, 212, the liquid 212 accumulates at a top of the liquid surface in the assay reservoir 204. After a number of liquid exchanges, the liquid 206 may be depleted such that the assay reservoir 204 only contains the liquid 212. In such embodiments, the liquid-detection system may determine that the receiving cavity 210 is not receiving liquid 206 and notify the user of the assay system that the assay reservoir 204 is empty and/or take additional actions.

The pressure activator 220 may be controlled by a computing system or device, such as the system controller 120 (FIG. 1) to selectively exchange the liquids 206, 212. For instance, the system controller may be configured to control the pressure activator 220 to exchange the liquids 206, 212 at an exchange rate. The exchange rate may be predetermined by a designated protocol that is carried out by the fluidic system. In other embodiments, the pressure activator 220 may selectively exchange the liquids 206, 212 after a liquid-detection system, such as the liquid-detection system 108, has determined that the liquid 206 is below a predetermined level or volume within the receiving cavity 210.

In the illustrated embodiment, the plunger 224 is a flexible membrane that is coupled to the storage housing 205. The plunger 224 may effectively seal the storage housing 205 such that ambient air or the gas 207 is not permitted to leak through the storage housing 205. For instance, the plunger 224 may cover an inlet port 234 of the storage housing 205. The flexible membrane is capable of being flexed to the first position by the pressure activator 220 and biased to flex back to the second position after being moved to the first position. In alternative embodiments, the plunger 224 may have other configurations. For example, the plunger 224 may be a solid disc that is moved back and forth by the pressure activator 220. In such embodiments, the liquid-exchange assembly 200 may be similar to a syringe pump.

In alternative embodiments, the pressure activator may be part of a continuous-flow system. For example, the liquids 206, 212 within the assay reservoir 204 may be selectively pumped by the pressure activator in a similar manner as the plunger 224. More specifically, a designated volume of the liquid 206 may be pumped into the assay reservoir 204 thereby causing an equal amount to exit the exchange port 208 into the receiving cavity 210. After the droplet(s) 230 have moved away from the port end 216, the pressure activator may then generate a negative pressure that sucks a designated volume of the liquid 212 into the assay reservoir 204.

The plunger 224 may be controlled to allow the droplet 230 to move away (e.g., sink) from the port end 216 and the droplet 232 to move away (e.g., rise) from the port end 232 before the plunger 224 is moved to the subsequent position. In some embodiments, the plunger 224 may pause in the first position or in the second position to allow the corresponding droplet to move away from the port end 232. The pause or delay in the corresponding position may also allow the other liquid to fill the space previously occupied by the droplet. Alternatively or in addition to pausing, a speed at which the plunger 224 moves from the first position to the second position may be controlled to facilitate droplet formation and sinking. Likewise, a speed at which the plunger 224 moves from the second position to the first position may be controlled to facilitate droplet formation and rising.

In some embodiments, a total volume of each droplet 230, 232 may range from 1.0 μL and 40.0 μL. In other embodiments, the total volume of each droplet 230, 232 may be greater. For example, the total volume of each droplet 230, 232 may be between 40 μL and 100 μL or between about 100 μL and 500 μL or more. A total volume of the assay reservoir 204 may be any volume desired. For example, a total volume of the assay reservoir 204 may be 1.0 milliliters, 5.0 milliliters, or more. In certain embodiments, a total volume of the assay reservoir 204 allows for the storage housing 205, which may include a number of different assay reservoirs, to be removably coupled to the assay system. For example, the storage housing 205 may be stored in a frozen environment prior to be operably positioned within the assay system. After the storage housing 205 is depleted, the storage housing 205 may be replaced by another storage housing.

Figure 5:
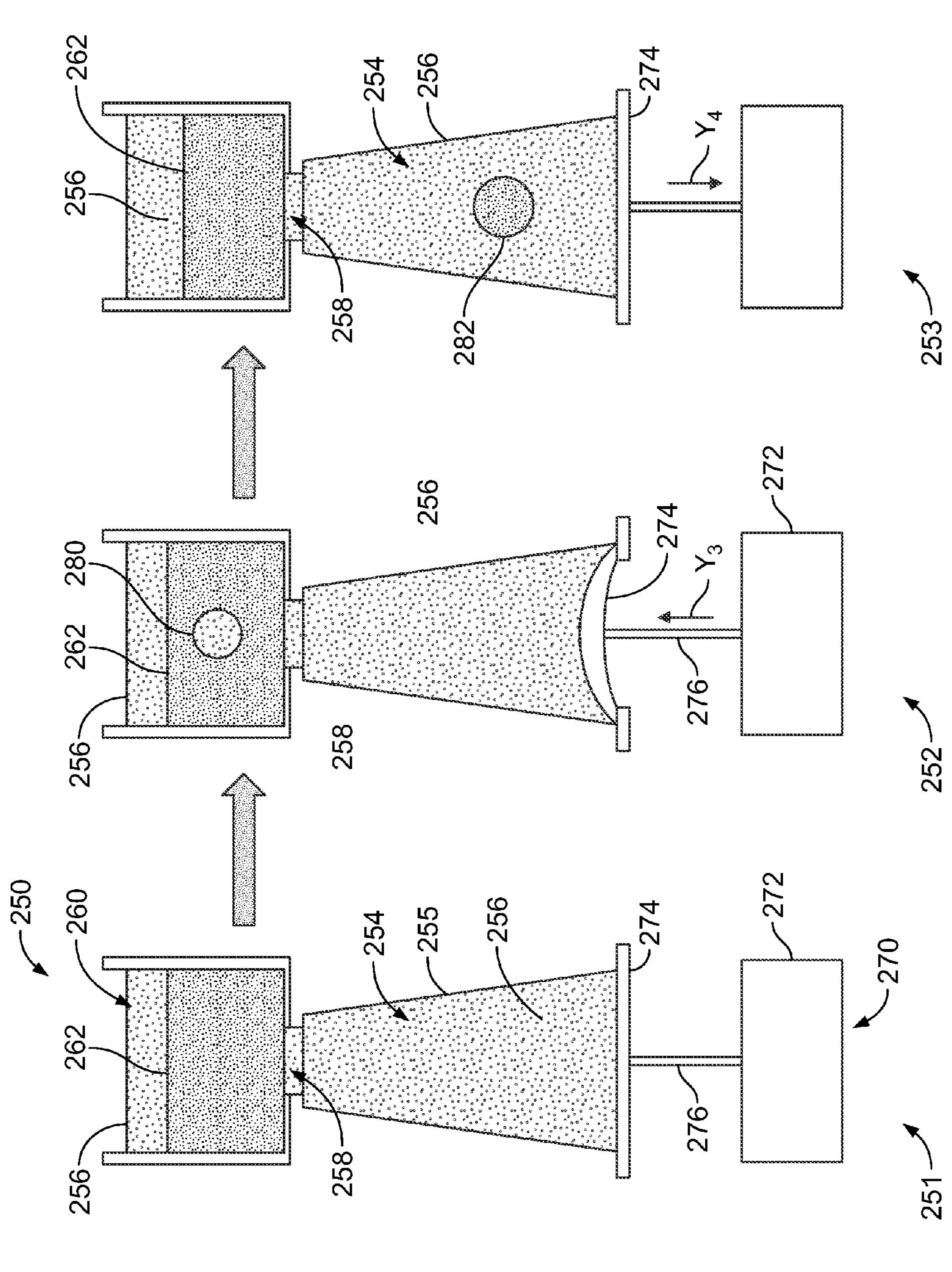
FIG. 5 is a schematic cross-section of a liquid-exchange assembly at different operating stages that may be used by the system of FIG. 1 in accordance with an embodiment to remove liquid from a fluidic system.

FIG. 5 is a schematic cross-section of a liquid-exchange assembly 250 at different operating stages 251-253. The liquid-exchange assembly 250 may be used with the assay system 100 (FIG. 1) and operate in a similar manner as the liquid-exchange assembly 200 (FIG. 4). The liquid-exchange assembly 250 may include a storage housing 255 that defines an assay reservoir 254 for holding a first liquid 256. The liquid-exchange assembly 250 also includes a receiving cavity 260 that is fluidically coupled to the assay reservoir 254 through an exchange port 258. The receiving cavity 260 may hold a second liquid 262 that is immiscible with respect to the liquid 256. The receiving cavity 260 may be part of or fluidically coupled to a fluidic system (not shown), such as the fluidic system 102 (FIG. 1), the droplet actuator 130 (FIG. 2), or the fluidic system 152 (FIG. 3). In the illustrated embodiment, the first liquid 256 is a filler liquid, such as oil, and the second liquid 262 is an aqueous liquid. In particular embodiments, the second liquid 262 is liquid waste that is generated by the fluidic system after the designated reactions are conducted.

The liquid-exchange assembly 250 also includes a pressure activator 270 that is operably coupled to the storage housing 255 and the assay reservoir 254. In the illustrated embodiment, the pressure activator 270 includes an actuator 272, a plunger 274 that is coupled to the storage housing 255, and a link 276 that operably connects the actuator 272 and the plunger 274. The link 276 may be, for example, a piston. The actuator 272 may be a motor that is configured to drive the link 276 thereby moving the plunger 274. The plunger 274 may be moved between first and second positions. The first position is shown with respect to the operating stage 252, and the second position is shown with respect to the operating stage 253 and, optionally, the operating stage 251.

During the operating stage 251, the liquid 262 may accumulate within the receiving cavity 260. The liquid 262 and the liquid 256 may be configured relative to each other and the exchange port 258 may be dimensioned such that the liquid 262 does not passively flow (e.g., sink) through the exchange port 258 due to gravity and a weight of the liquid 256 on top of the liquid 262 in the receiving cavity 260. For example, the exchange port 258 may have fluidic dimensions such that the cohesive forces and adhesive forces of the liquid 262 prevent the liquid 262 from freely flowing through the exchange port 258.

During the operating stage 252, the plunger 274 is driven by the actuator 272 and the link 276 to the first position. In the illustrated embodiment, the plunger 274 is driven in a first direction $Y_3$. As the plunger 274 is driven to the first position, the plunger 274 displaces the liquid 256 thereby forcing the liquid 256 through the exchange port 258 and into the receiving cavity 260. At the operating stage 252, as the liquid 256 exits the exchange port 258, the liquid 256 may form a droplet 280 caused by the liquid-liquid interface between the liquids 256, 262, and rise within the receiving cavity 260. As the droplet(s) 280 rise within the receiving cavity 260, the liquid 262 fills the space that is proximate to the exchange port 258.

During the operating stage 253, the plunger 274 is retracted by the actuator 272 to a second position. When moving from the first position to the second position, the plunger 274 moves in a second direction $Y_4$ that is opposite the first direction $Y_3$. As the plunger 274 moves to the second position, the plunger 274 generates a negative pressure or suction force. The negative pressure draws a designated volume of the liquid 262 through the exchange port 258 and into the assay reservoir 254. The designated volume of the liquid 262 may form one or more droplets 282, caused by the cohesive forces of the liquid waste 262 and/or the liquid-liquid interfacial tension. As the droplet(s) 282 sink within the assay reservoir 254, the liquid 256 fills the space proximate to the exchange port 258. As such, the liquid 256 is primed for being displaced into the receiving cavity 260. After the operating stage 253, the liquids 256, 262 may again be in equilibrium such that the liquid 262 does not freely flow through the exchange port 258.

The liquid-exchange assembly 250 is configured to cycle through the operating stages 251-253 to load the liquid 256 and to remove the liquid 262. Accordingly, the pressure activator 270 may be configured to repeatedly exchange the liquids 256, 262 by (a) driving a designated volume of the liquid 256 (e.g., the droplet(s) 280) through the exchange port 258 into the receiving cavity 260 and (b) drawing a designated volume of the liquid 262 (e.g., the droplet(s) 282) through the exchange port 258 into the assay reservoir 254. The designated volumes of each droplet 230, 232 may be similar to the volumes described above with respect to the liquid-transport assembly 200. For example, the volumes of each droplet 230, 232 may be between 1.0 μL and 40.0 μL, 40 μL and 100 μL, or between about 100 μL and 500 μL. After each exchange of the liquids 256, 262, the liquid 262 accumulates at a bottom of the assay reservoir 254. After a number of liquid exchanges, the liquid 262 may be depleted from the receiving cavity 260 such that the receiving cavity 260 only contains the liquid 256. At this time, if the pressure activator 270 continues to exchange liquid, only the liquid 256 will flow into and out of the receiving cavity 260.

The pressure activator 270 may be controlled by a computing system or device, such as the system controller 120 (FIG. 1) to selectively exchange the liquids 256, 262. In some embodiments, the system controller may be configured to control the pressure activator 270 to exchange the liquids 256, 262 at an exchange rate. The exchange rate may be predetermined by a designated protocol that is carried out by the fluidic system. In other embodiments, the pressure activator 270 may selectively exchange the liquids 256, 262 after a liquid-detection system, such as the liquid-detection system 108, has determined that the liquid 262 is above a predetermined level or volume within the receiving cavity 260. Like the liquid-exchange assembly 200, movement of the plunger 274 may be controlled to allow droplet formation and droplet movement away from the exchange port 258.

In alternative embodiments, the pressure activator may be part of a continuous-flow system. For example, the liquids 256, 262 within the assay reservoir 254 may be selectively pumped by the pressure activator in a similar manner as the plunger 224 (FIG. 2). More specifically, a designated volume of the liquid 256 may be pumped into the assay reservoir 254 thereby causing an equal amount to exit the exchange port 258 into the receiving cavity 260. After the droplet(s) 280 have moved away from the exchange port 258, the pressure activator may then generate a negative pressure that sucks a designated volume of the liquid 262 into the assay reservoir 254.

Figure 6:
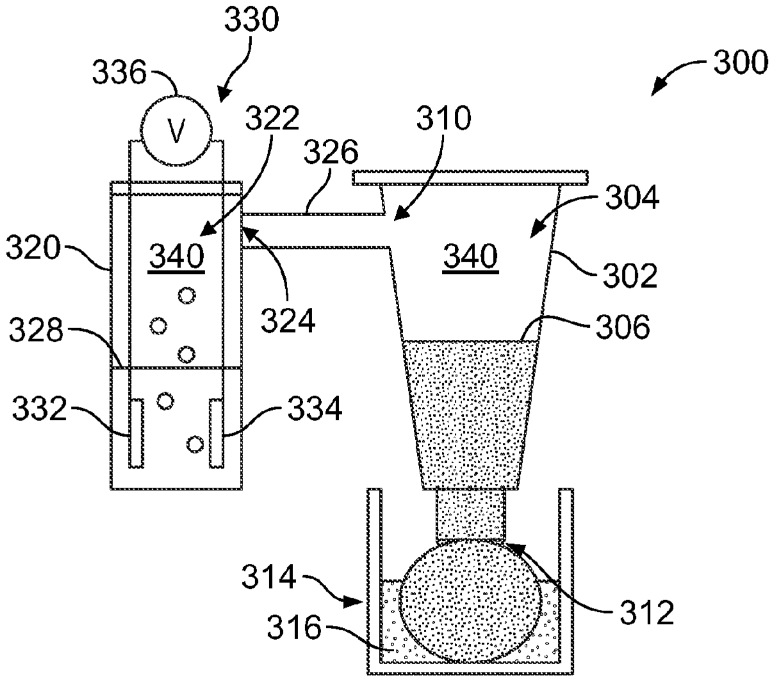
FIG. 6 is a schematic cross-section of a liquid-delivery assembly that may be used by the system of FIG. 1 in accordance with an embodiment to load liquid into a fluidic system.

FIG. 6 is a schematic cross-section of a liquid-transport assembly 300, which may be used with the assay system 100 (FIG. 1). The liquid-transport assembly 300 is configured to deliver a liquid and, as such, is hereinafter referred to as the liquid-delivery assembly 300. The liquid-delivery assembly 300 includes a storage housing 302 that defines an assay reservoir 304 that is configured to hold a liquid 306. The liquid 306 is an aqueous liquid in an exemplary embodiment, but other liquids (e.g., non-polar liquids) may be used in other embodiments. The storage housing 302 (or the assay reservoir 304) includes inlet and outlet ports 310, 312. The outlet port 312 is positioned proximate to or within a receiving cavity 314. The outlet port 312 is a nozzle in the illustrated embodiment. The receiving cavity 314 may be part of a fluidic system (not shown) and hold a liquid 316. In the illustrated embodiment, the liquids 306, 316 are immiscible.

The liquid-transport assembly 300 also includes a secondary housing 320 having a secondary chamber 322. The secondary housing 320 has an outlet port 324 that is coupled to the inlet port 310 through a gas bridge or conduit 326 such that the secondary chamber 322 is fluidically coupled to the assay reservoir 304. As shown, an electrolytic solution 328 is held by the secondary housing 320 within the secondary chamber 322. In some embodiments, the storage housing 302, the secondary housing 320, and the gas bridge 326 form a closed system such that gas and/or liquid may only exit the closed system through the outlet port 312.

The liquid-transport assembly 300 also includes a pressure generator 330 having first and second electrodes 332, 334 that are disposed within the secondary chamber and a power source (e.g., current or voltage source) 336 that is electrically connected to the electrodes 332, 334. The pressure generator 330 is configured to provide, through the power source 336, a voltage between the electrodes 332, 334 to generate a loading gas 340 through electrolysis. As shown, the loading gas 340 is located within the secondary chamber 322 and the assay reservoir 304. As the loading gas 340 is generated from the electrolytic solution 328 in the secondary chamber 322, a pressure imposed by the loading gas 340 on the liquid 306 in the secondary chamber 322 and the assay reservoir 304 increases thereby causing the liquid 306 to flow through the outlet port 312 and into the receiving cavity 314. If the voltage is not provided between the electrodes 332, 334, the gas generation will stop and the loading gas 340 and the liquid 306 will return to a state of equilibrium such that the liquid 306 will no longer flow through the outlet port 312.

The voltage maintained between the electrodes 332, 334 may determine a rate of gas generation (e.g., bubble rate) within the secondary chamber 322. In some embodiments, a system controller, such as the system controller 120 (FIG. 1), is configured to selectively control the voltage between the electrodes 332, 334 to control gas generation and, consequently, a flow rate of the liquid 306 through the outlet port 312. In some embodiments, the system controller may be configured to selectively oscillate the voltage to incrementally provide designated volumes of the liquid 306 through the outlet port 312. For example, the system controller may be configured to apply a voltage for one second during which time gas will be generated, remove the voltage for two seconds to stop gas generation, apply a voltage for another second, remove the voltage for two seconds, and so on. In other embodiments, the system controller may generate gas in accordance with a predetermined sequence based on the assay protocol. For example, the assay protocol may demand a substantial amount of the liquid 306 during early stages of the assay protocol, but may not require the liquid 306 at later stages. Accordingly, the voltage will be applied more often earlier in the assay protocol than at later times.

In some embodiments, the liquid-transport assembly 300 may include or be communicatively coupled to an assay sensor that is configured to detect operational data. The system controller may be configured to increase or decrease the voltage based on the operational data. For example, the operational data may be a level or volume of the liquid 306 within the receiving cavity 314. To this end, the assay sensor may be an electrode or probe that is configured to detect a capacitance of the liquid 306 as described above. In other embodiments, the operational data may be based on fluidic operations occurring downstream with respect to the assay reservoir.

Figure 7:
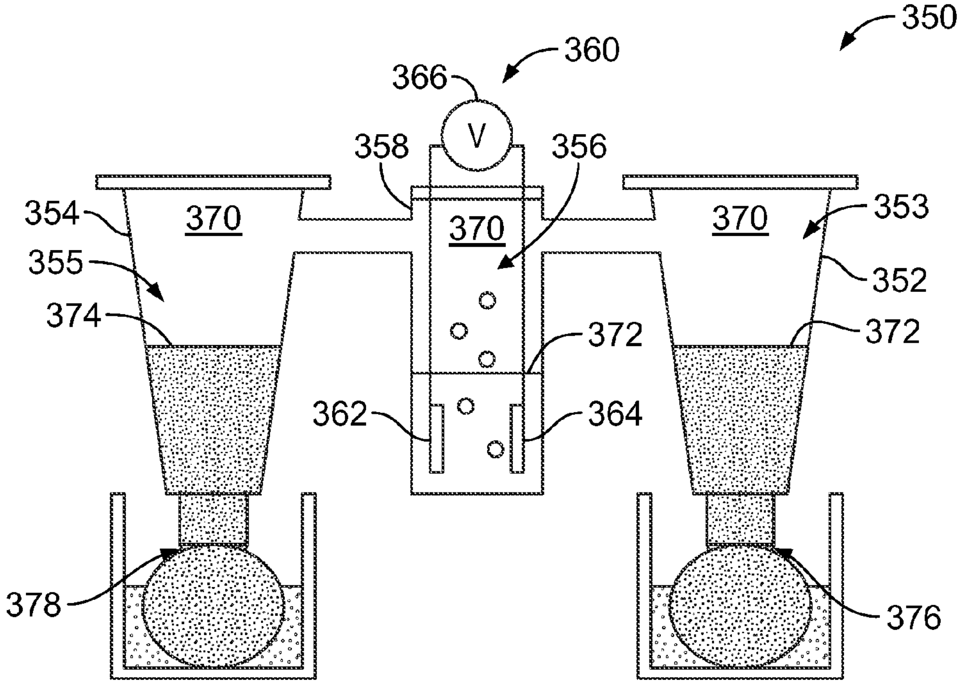
FIG. 7 is a schematic cross-section of a liquid-delivery assembly that may be used by the system of FIG. 1 in accordance with an embodiment to simultaneously load multiple liquids into a fluidic system.

FIG. 7 is a schematic cross-section of a liquid-transport assembly 350, which may be used with the assay system 100 (FIG. 1). The liquid-transport assembly 350 is configured to deliver multiple liquids to one or more fluidic systems and, as such, is hereinafter referred to as the liquid-delivery assembly 350. The liquid-delivery assembly 350 is similar to the liquid-delivery assembly 300 (FIG. 6), but includes two storage housings 352, 354 that define respective assay reservoirs 353, 355. Each of the assay reservoirs 353, 355 is fluidically connected to a common secondary chamber 356 that is defined by a secondary housing 358. The liquid-delivery assembly 350 also includes a pressure generator 360 that includes first and second electrodes 362, 364 that are electrically connected to a power source 366. Similar to the liquid-delivery assembly 300, during operation of the pressure generator 360, a loading gas 370 is generated within the secondary chamber 356.

As the loading gas 370 is generated from electrolytic solution 372 in the secondary chamber 356, a pressure imposed by the loading gas 370 on liquids 372, 374 in the assay reservoirs 353, 355, respectively, increases thereby causing the liquids 372, 374 to flow through corresponding outlet ports 376, 378, respectively. Because the secondary chamber is fluidically coupled to both of the assay reservoirs 353, 355, the pressure of the loading gas 370 is the same. Accordingly, the liquid-delivery assembly 350 may simultaneously load liquids into a fluidic system at a common flow rate.

Figure 8:
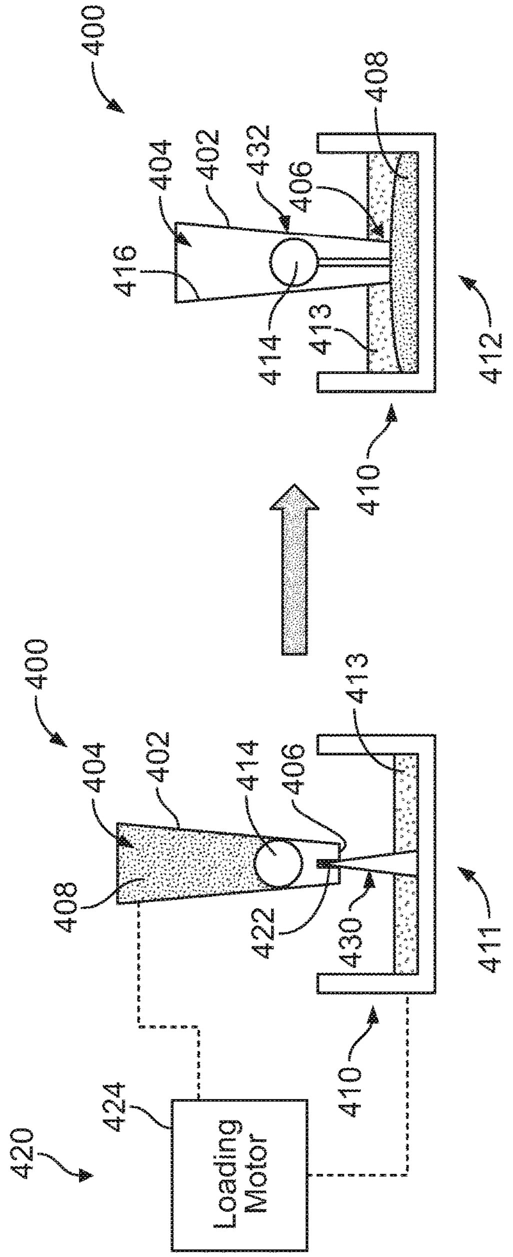
FIG. 8 is a schematic cross-section of a liquid-delivery assembly that may be used by the system of FIG. 1 in accordance with an embodiment.

FIG. 8 is a schematic cross-section of a liquid-transport assembly 400, which may be used by the assay system 100 (FIG. 1). The liquid-transport assembly 400 is shown in a holding stage 411 and in a dispensed stage 412. The liquid-transport assembly 400 includes a storage housing 402 that defines an assay reservoir 404 having an outlet port 406. The storage housing 402 may define a nozzle that includes the outlet port 406. The assay reservoir 404 is configured to hold and deliver a liquid 408 through the outlet port 406. The liquid 408 is configured to be delivered to a receiving cavity 410 of, for example, a fluidic system (not shown). The receiving cavity 410 may include a liquid 413. In the illustrated embodiment, the liquids 408 and 413 are immiscible. For example, the liquid 408 is an aqueous liquid and the liquid 413 is a filler liquid (e.g., oil). Although not shown, the receiving cavity 410 may be operably positioned with respect to one or more electrodes. The electrodes may be configured to transport droplets of the liquid 408 from the receiving cavity 410 using electrowetting-mediated operations and/or detect a volume or level of the liquid 408 within the receiving cavity 410.

The liquid-transport assembly 400 also includes a movable plug 414 that is positioned within the assay reservoir 404 and held by the storage housing 402. More specifically, the storage housing 402 includes one or more interior surfaces 416 that directly engage the movable plug 414 during the holding stage 411. The movable plug 414 is sized and shaped relative to the assay reservoir 404 and the outlet port 406 to block flow of the liquid 408 during the holding stage 411. As shown in FIG. 8, the movable plug 414 may be positioned at the outlet port 406 to block the liquid 408 from flowing therethrough. In some embodiments, the movable plug 414 may form an interference fit with respect to the interior surface(s) 416 of the storage housing 402.

In some embodiments, the liquid-transport assembly 400 includes a loading mechanism 420 that includes a plug-engaging surface 422 and a loading motor 424 that is coupled to at least one of the assay reservoir 404 or the plug-engaging surface 422. In an exemplary embodiment, the loading motor 424 may be directly coupled to the storage housing 402 and/or the fluidic system that includes the receiving cavity 410. For illustrative purposes, the loading motor 424 is only shown with respect to the holding stage 411.

In particular embodiments, the loading motor 424 is configured to move at least one of the storage housing 402 or the fluidic system relatively toward one another in order to displace the movable plug 414. For example, the loading motor 424 may move the assay reservoir 404 and the plug-engaging surface 422 relative to each other such that the plug-engaging surface 422 displaces the movable plug 414 with respect to the outlet port 406. When the movable plug 414 is displaced, the liquid 408 is permitted to flow through the outlet port 406 and into the receiving cavity 410 as shown in the dispensed stage 412.

In an exemplary embodiment, the loading mechanism 420 includes a dislodging projection 430 that has the plug-engaging surface 422. The dislodging projection 430 is sized and shaped relative to the outlet port 406 for insertion into and through the outlet port 406. For example, the dislodging projection 430 may be pin-shaped. When the plug-engaging surface 422 and the assay reservoir 404 move relatively toward each other, the dislodging projection 430 may advance through the outlet port 406 and directly engage the movable plug 414. As the plug-engaging surface 422 and the assay reservoir 404 continue to move closer to one another, the movable plug 414 is displaced by the dislodging projection 430 to form one or more gaps 432 between the movable plug 414 and the interior surface 416. The gaps 432 permit the liquid 408 to flow therethrough and into the receiving cavity 410.

In alternative embodiments, the dislodging projection 430 may be moved relative to the receiving cavity 410 and the storage housing 402. For instance, the loading motor 424 may be configured to move the dislodging projection 430 to and from the outlet port 406 through an opening of the fluidic system that defines the receiving cavity 410.

Figure 9:
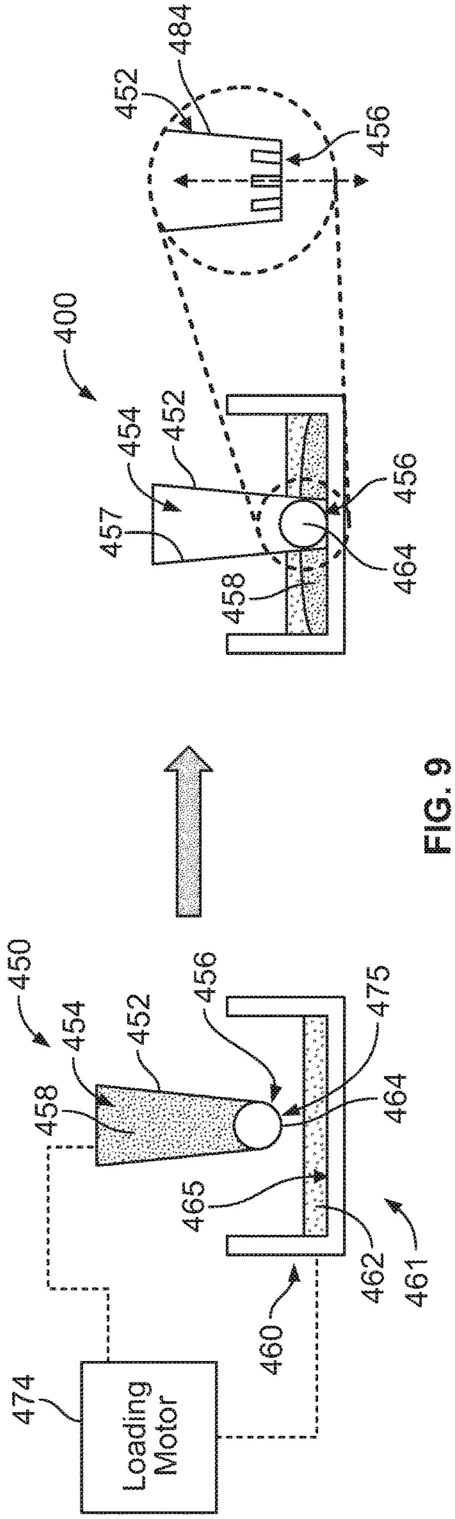
FIG. 9 is a schematic cross-section of a liquid-delivery assembly that may be used by the system of FIG. 1 in accordance with an embodiment.

FIG. 9 is a schematic cross-section of a liquid-transport assembly 450, which may be used by the assay system 100 (FIG. 1) and may be similar to the liquid-transport assembly 400 (FIG. 8). For example, the liquid-transport assembly 450 includes a storage housing 452 that defines an assay reservoir 454 having an outlet port 456. The assay reservoir 454 is configured to hold and deliver a liquid 458 through the outlet port 456. The liquid 458 is configured to be delivered to a receiving cavity 460 of, for example, a fluidic system (not shown). The receiving cavity 460 holds a liquid 462. As shown, the receiving cavity 460 is partially defined by a bottom surface 465. The bottom surface 465 may define a plug-engaging surface 465 that is configured to engage a movable plug 464.

As shown, the movable plug 464 is positioned within the assay reservoir 454 and held by the storage housing 452. The storage housing 452 includes one or more interior surfaces 457 that directly engage the movable plug 464 during a holding stage 461. The movable plug 464 blocks flow of the liquid 458 during the holding stage 461. As shown in FIG. 9, the movable plug 464 is sized and shaped relative to the outlet port 456 such that a protruded portion 475 of the movable plug 464 clears the outlet port 456.

The liquid-transport assembly 450 also includes a loading mechanism 470 that includes the plug-engaging surface 465 and a loading motor 474 that is coupled to at least one of the assay reservoir 454 or the plug-engaging surface 465. In an exemplary embodiment, the loading motor 474 may be directly coupled to the storage housing 452 and/or the fluidic system that includes the receiving cavity 460. For illustrative purposes, the loading motor 474 is only shown with respect to the holding stage 461.

The loading motor 474 is configured to move the plug-engaging surface 465 and the assay reservoir 454 in order to displace the movable plug 464. For example, as the assay reservoir 454 and plug-engaging surface 465 move toward each other, the protruded portion 475 of the movable plug 464 may be submerged within a filler liquid 462. The protruded portion 475 may be incident on the plug-engaging surface 465, which provides a dislodging force away from the plug-engaging surface 465. The dislodging force may overcome frictional forces generated between the interior surfaces 416 and the movable plug 464 causing the movable plug 464 to be displaced. The protruded portion 475 may move through the outlet port 456 when the movable plug 464 is displaced. When the movable plug 464 is displaced, one or more gaps 482 may form between the movable plug 464 and the interior surfaces 457 thereby permitting the liquid 458 to flow therethrough. In some embodiments, if an edge that defines the opening of the outlet port 456 is pressed against the plug-engaging surface 465, flow of the liquid 458 may be impeded. As such, the loading motor 474 may be configured to locate the edge a distance away from the plug-engaging surface 465 so that the liquid 458 may flow therethrough. Alternatively or in addition to the edge being located a distance away, the storage housing 452 may include slits or notches that are located proximate to the outlet port 456. The slits may provide a larger opening for the liquid 458 to flow therethrough.

FIG. 9 illustrates the storage housing 452 in greater detail. In some embodiments, the storage housing 452 includes a nozzle 484 that has the outlet port 456. Optionally, the nozzle 484 extends lengthwise along a central axis 486 and has a nozzle wall 488 that circumferentially surrounds the central axis 486. The nozzle wall 488 may include one or more openings 490 (e.g., slits) therethrough. The movable plug 464 may cover or block flow through the opening(s) 490 when held at the outlet port 456. When the movable plug 464 is displaced, one or more passages for the liquid to flow through may be formed through the opening(s) 490. Although the above was described with respect to the liquid-transport assembly 450 in FIG. 9, other embodiments may also include a nozzle having openings. For example, the liquid-transport assembly 400 (FIG. 8) may also include a nozzle with openings.

In other embodiments, the movable plug is configured to be damaged or destroyed to permit the liquid to flow therethrough. For example, the movable plug may be a foil or film located at the outlet port. In one embodiment, the dislodging projection 430 may perforate (e.g., tear) the movable plug as the assay reservoir and the plug-engaging surface are moved relative to each other. When the movable plug is perforated such that a hole exists through the movable plug, the liquid may be permitted to flow therethrough into the receiving cavity.

For some embodiments, the movable plug may be sufficiently dissolved to permit the aqueous liquid to flow into the receiving cavity. The movable plug may be dissolved chemically or thermally. As one particular example, the receiving cavity may be part of a DF device or droplet actuator. The DF device may be configured to conduct electrowetting operations to transport one or more droplets of a working liquid to a designated location within the receiving cavity. The working liquid may be held at the designated location while the outlet port is positioned at the designated location so that the working liquid contacts the movable plug. The working liquid may chemically dissolve the movable plug at the designated location. In some embodiments, the working liquid may be immiscible with respect to the aqueous liquid. For instance, the working liquid may be displaced by the aqueous liquid when the aqueous liquid flows through the outlet port into the receiving cavity.

Figure 10:
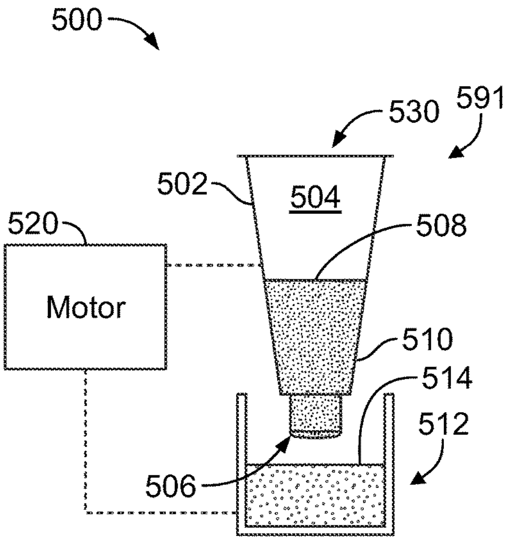
FIG. 10 is a schematic cross-section of a passive liquid-delivery assembly that may be used by the system of FIG. 1 in accordance with an embodiment.
Figure 11:
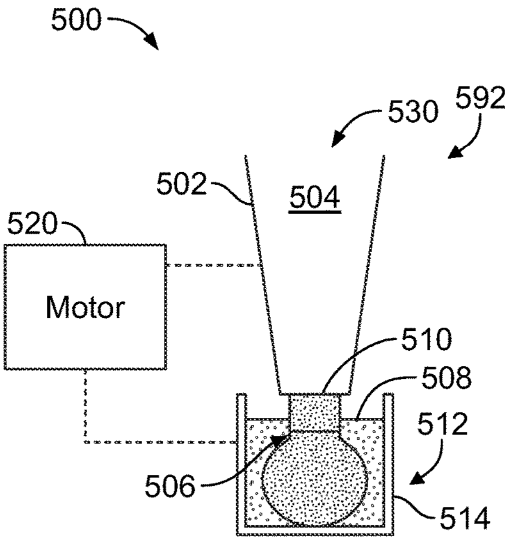
FIG. 11 is the liquid-delivery assembly of FIG. 11 when the liquid-delivery assembly is in a dispensed state.

FIG. 10 is a schematic cross-section of a liquid-transport assembly 500, which may be used with the assay system 100 (FIG. 1). The liquid-transport assembly 500 is shown in a holding stage 591. FIG. 11 illustrates the liquid-transport assembly 500 in a dispensed stage 592. The liquid-transport assembly 500 includes a storage housing 502 that defines an assay reservoir 504 configured to hold an aqueous liquid 508. The assay reservoir 504 includes an outlet port 506 that is defined by an interior surface 510 of the storage housing 502. The liquid-transport assembly 500 is configured to deliver the aqueous liquid 508 to a fluidic system, such as DF device. The fluidic system (not shown) may include a receiving cavity 512 having a liquid 514 disposed therein. The liquid 514 is immiscible with respect to the aqueous liquid 508. As shown in FIGS. 10 and 11, the liquid 508 experiences a gravitational force toward the outlet port 506.

The liquid-transport assembly 500 also includes a loading motor 520 that is configured to move at least one of the assay reservoir 504 or the receiving cavity 512 toward one another. The loading motor 520 is configured to move the outlet port 506 and the receiving cavity 512 relative to each other such that the aqueous liquid 508 at the outlet port 506 and the filler liquid 514 in the receiving cavity 512 engage each other.

In certain embodiments, the interior surface 510 has a surface energy that is configured relative to the aqueous liquid 508 such that the aqueous liquid 508 is held at the outlet port 506 without flowing therethrough. More specifically, the interior surface 510 is dimensioned and the surface energy of the interior surface 510 is configured to retain the aqueous liquid 508 within the assay reservoir 504 before the aqueous liquid 508 engages the filler liquid 514. In the illustrated embodiment, the storage housing 502 includes an inlet port 530 that is open to an ambient gas. Prior to loading the aqueous liquid 508, the inlet port 530 may be covered with a seal 531. The seal 531 may protect the aqueous liquid 508 from contamination and/or facilitate holding the aqueous liquid 508 within the assay reservoir 504. As such, the interior surface 510 is dimensioned and the surface energy of the interior surface 510 is configured to retain a weight of the aqueous liquid 508.

When the aqueous liquid 508 and the filler liquid 514 directly engage each other, the liquid-liquid interface affects the cohesive forces of the aqueous liquid 508 thereby disrupting the forces the retain the aqueous liquid 508 within the storage housing 502. Accordingly, the interior surface 510 is dimensioned and the surface energy of the interior surface 510 is configured to permit the aqueous liquid 508 to flow through the outlet port 506 and into the receiving cavity 512 when the aqueous liquid 508 engages the filler liquid 514.

Figure 12:
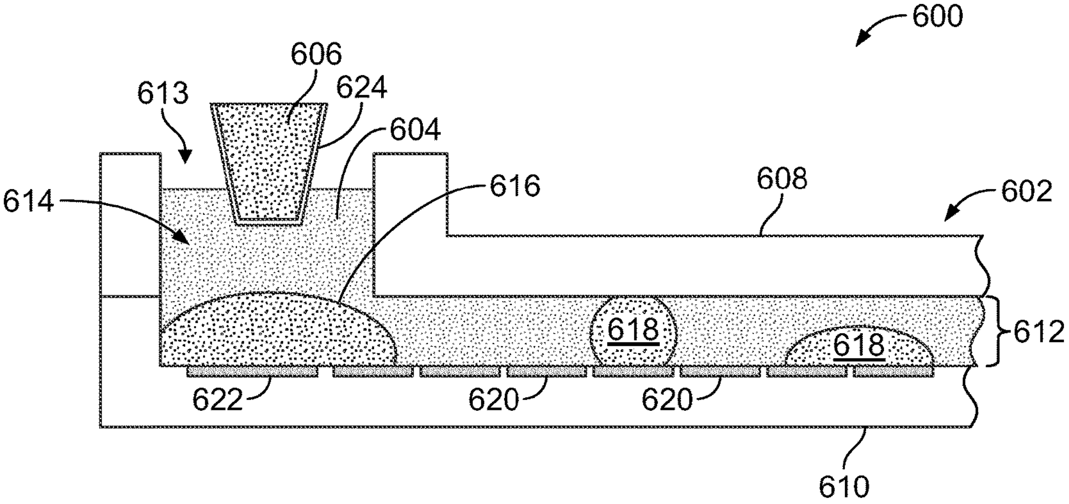
FIG. 12 illustrates a schematic side view of a system formed in accordance with an embodiment.

FIG. 12 illustrates a cross-section of a portion of a system 600 formed in accordance with an embodiment. The system 600 may be or include a DF device or droplet actuator in some embodiments. The system 600 has a housing 602 that is configured to hold a filler fluid 604 (e.g., oil) and one or more solutions 606 (e.g., reagent or sample solutions). The housing 602 may be formed from multiple components. For example, the housing 602 includes a top or cover substrate 608 and a bottom substrate 610. The top substrate 608 is mounted to the bottom substrate 610. The top and bottom substrates 608, 610 are separated by an operational gap that defines a device channel 612. The top substrate 608 has an opening 613. When the top substrate 608 is mounted to the bottom substrate 610, the top and bottom substrates 608, 610 form a receiving cavity 614 that is accessible through the opening 613. The receiving cavity 614 is sized and shaped to hold a volume 616 of the solution 606 and is configured to receive the solution 606 from an assay reservoir 624.

As shown, droplets 618 may be formed from the larger volume 616 within the receiving cavity 614 and transported through the device channel 612. To this end, the housing 602 may include an arrangement of electrodes 620 that are positioned along the device channel 612. For instance, the bottom substrate 610 includes a series of the electrodes 620 positioned along the device channel 612. The top substrate 610 may include a reference electrode (not shown). Alternatively, the bottom substrate 610 may include a reference electrode. The bottom substrate 610 may also include a reservoir electrode 622. The reservoir electrode 622 may be utilized by the system controller to hold the larger volume 616. The electrodes 620, 622 are electrically coupled to a system controller (not shown), such as the system controller 120 (FIG. 1). The system controller is configured to control voltages of the electrodes 620, 622 to conduct electrowetting operations. More specifically, the electrodes 620, 622 may be activated/deactivated to form droplets 618 from the larger volume 616 and move the droplets 618 away from the receiving cavity 614 through the device channel 612.

Alternatively or in addition to holding the larger volume 616, the reservoir electrode 622 may be utilized to detect a volume of the volume 616. More specifically, the electrode 622 may communicate information that may be used to determine the volume 616. If the volume 616 is determined to be insufficient, the system controller may activate a mechanism that is configured to load or re-load the receiving cavity 614 with the solution from the assay reservoir 624. For example, one or more of the embodiments described herein may be used to load the receiving cavity 614 with the solution 616. The solution 616 may be actively or passively provided into the receiving cavity 614.

In the illustrated embodiment, the assay reservoir 624 is located upstream with respect to the device channel 612. In alternative embodiments, the assay reservoir may be located downstream with respect to the device channel. For example, returning briefly to the liquid-exchange assembly 250 shown in FIG. 5, the receiving cavity 260 may be in flow communication with a device channel (not shown) that is similar to the device channel 612. The electrodes (not shown) of the device channel may transport droplets to the receiving cavity 260, wherein the droplets accumulate to form the volume within the receiving cavity 260. The liquid-exchange assembly 250 may then be used to exchange the liquid 262 with the liquid 256. In such embodiments, the liquid 262 may be waste that has already been used by the system to conduct designated reactions.

Figure 13:
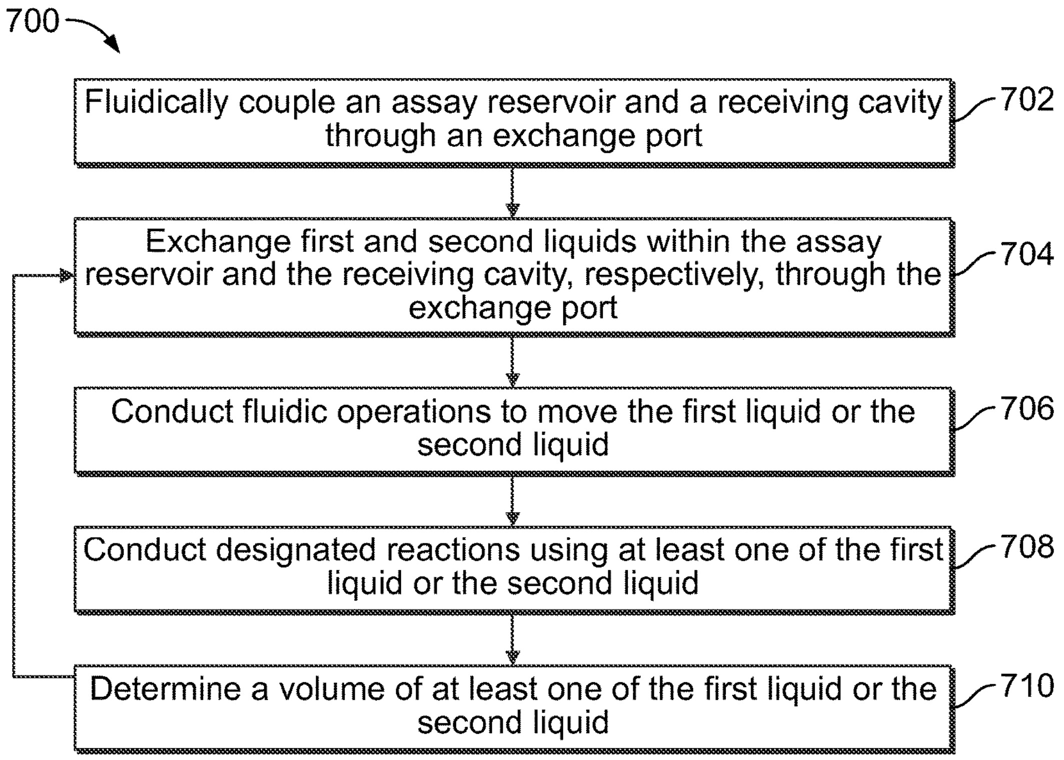
FIG. 13 is a flowchart illustrating a method in accordance with an embodiment.

FIG. 13 is a flowchart illustrating a method 700 in accordance with an embodiment. The method 700 may be, for example, to transport liquid within a device or system. The method 700 may employ, for example, structures or aspects of various embodiments described herein, such as those shown in FIGS. 1-3, 4, 5, and 12. The method 700 may include fluidically coupling (at 702) an assay reservoir holding a first liquid and a receiving cavity holding a second liquid through an exchange port. The first and second liquids may be immiscible with respect to each other. For example, one of the liquids may be a polar liquid (e.g., aqueous solution) and the other liquid may be a non-polar liquid (e.g., oil). In some embodiments, the receiving cavity may be in flow communication with a device channel that is located downstream with respect to the receiving cavity. The device channel may be part of a DF device or droplet actuator. IN some embodiments, the receiving cavity may be configured to provide the device channel with a liquid. For example, the device channel may transport the liquid to another location in which the liquid is used for during a biochemical assay. In particular embodiments, the device channel may include electrodes positioned therealong that are configured to conduct electrowetting operations. Alternatively, the device channel may be located upstream with respect to the receiving cavity such that the device channel provides (directly or indirectly) a liquid to the receiving cavity. For example, the liquid may be waste from previous designated reactions.

At 704, the first and second liquids may be exchanged through the exchange port. The first liquid and the second liquid may flow through the same passage. The exchanging (at 704) may occur by repeatedly flowing a designated volume of the first liquid through the exchange port into the receiving cavity and flowing a designated volume of the second liquid through the exchange port into the assay reservoir. For example, a pressure activator may drive the first liquid through the exchange port and, subsequently, draw the second liquid through the exchange port. The first and second liquids may be exchanged at an exchange rate. In some embodiments, the exchange rate is predetermined and based on designated protocol carried out for biological or chemical analysis. In other embodiments, a volume of the first liquid and/or the second liquid may be monitored at designated spaces (e.g., the receiving cavity and/or the assay reservoir). The exchange rate may be based on the volume determined at the designated spaces.

As one example, a plunger may be operably coupled to the assay reservoir and may be configured to move between first and second positions. As the plunger moves from the first position to the second position, a designated volume of the first liquid may be driven through the exchange port into the receiving cavity. As the plunger moves from the second position to the first position, a designated volume of the second liquid may be drawn through the exchange port into the assay reservoir. In alternative embodiments, the pressure activator may drive the second liquid through the exchange port and, subsequently, draw the first liquid through the exchange port.

The method 700 may also include conducting (at 706) fluidic operations to move the first or second liquid. For example, the conducting (at 706) may include conducting electrowetting operations to move droplets of the first liquid or the second liquid. For example, the conducting (at 706) may include moving droplets away from the receiving cavity such that a volume of the corresponding liquid is reduced. Alternatively, the conducting (at 706) may include moving droplets toward the receiving cavity in which the droplets accumulate within the receiving cavity. The method 700 may also include conducting (at 708) designated reactions with at least one of the first liquid or the second liquid. The designated reactions may be for biochemical analysis. The conducting (at 708) may occur while the first and second liquids are exchanged, before the first and second liquids are exchanged, and/or after the first and second liquids are exchanged.

At 710, the method 700 may include determining a volume of the first liquid or the second liquid. For example, a volume of the first liquid within the assay reservoir and/or within the receiving cavity may be detected. Alternatively or in addition to this, a volume of the second liquid within the assay reservoir and/or the receiving cavity may be detected. The volume(s) may be determined based on operational data. For example, the determination (at 710) may include obtaining electrical data (e.g., capacitance or impedance values) from a sensor that is operably positioned with respect to the receiving cavity or the assay reservoir. The electrical data may be indicative of a volume of the corresponding liquid. The determination (at 710) may also include obtaining optical data from a sensor that is operably positioned with respect to the receiving cavity or the assay reservoir. The optical data may be indicative of a volume of the corresponding liquid. Optionally, the determination (at 710) may include estimating the volume(s) based on other information. For instance, the volume(s) may be estimated by the amount of time that has transpired, by the number of designated reactions or other events that have occurred downstream or upstream, and/or by the amount of other reagents consumed.

Figure 14:
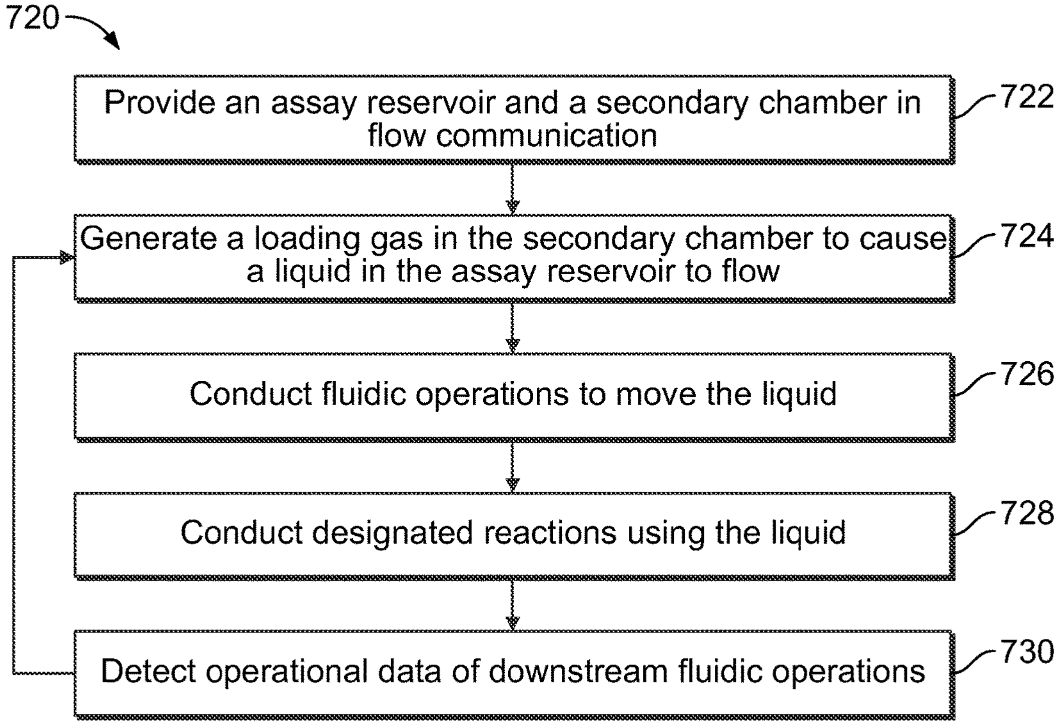
FIG. 14 is a flowchart illustrating a method in accordance with an embodiment.

FIG. 14 is a flowchart illustrating a method 720 in accordance with an embodiment. The method 720 may employ, for example, structures or aspects of various embodiments (e.g., systems and/or methods) discussed herein, such as those shown in FIGS. 1-3, 6, 7, and 12. The method 720 may include providing (at 722) an assay reservoir and a secondary chamber. The assay reservoir may have inlet and outlet ports and hold a liquid therein. The secondary chamber may be in flow communication with the inlet port of the assay reservoir and hold an electrolytic solution. Optionally, one or more additional assay reservoirs may be in flow communication with the secondary chamber.

The method 720 may also include generating (at 724) a loading gas in the secondary chamber through electrolysis. As the loading gas is generated in the secondary chamber, a pressure imposed by the loading gas on the liquid in the assay reservoir may increase. As the pressure increases, the pressure may force the liquid within the assay reservoir to flow through the outlet port. The generating (at 724) may include applying a voltage between first and second electrodes within the secondary chamber. The voltage may be selectively controlled to control a flow rate of the liquid through the outlet port. The voltage may be selectively oscillated to incrementally provide designated volumes of the liquid through the outlet port. Similar to the method 700, the method 720 may also include conducting (at 726) fluidic operations and/or conducting (at 728) designated reactions with the liquid.

The method 720 may also include detecting (at 730) operational data regarding fluidic operations that occur downstream with respect to the assay reservoir. The generating (at 724) may be based on the operational data. For example, the rate at which gas is generated may be increased or decreased based on the operational data. If the operational data indicates that the liquid is presently low and/or a larger amount of liquid will be needed downstream, the rate of gas generation may be increased. If the operational data indicates that the liquid is sufficient and/or a lesser amount of liquid will be needed downstream, the rate of gas generation may be decreased. The operational data may be electrical data, optical data, or other operational data, such as the data described above.

Figure 15:
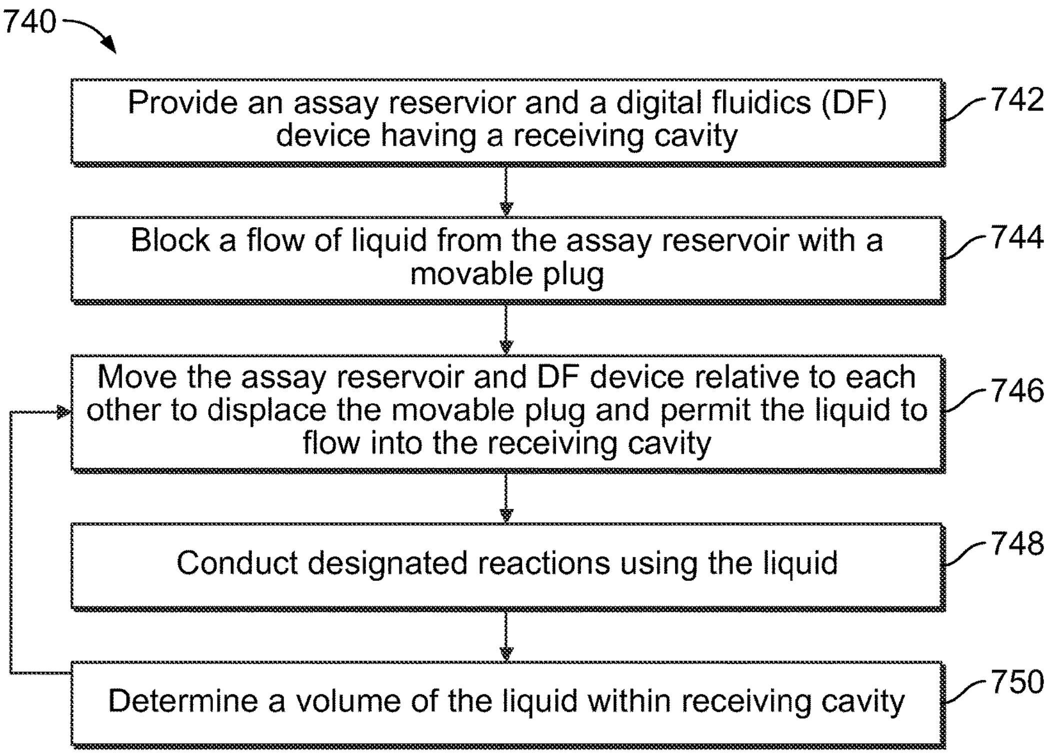
FIG. 15 is a flowchart illustrating a method in accordance with an embodiment.

FIG. 15 is a flowchart illustrating a method 740 in accordance with an embodiment. The method 740 may employ, for example, structures or aspects of various embodiments (e.g., systems and/or methods) discussed herein, such as those shown in FIGS. 1-3, 8, 9, and 12. The method 740 may include providing (at 742) an assay reservoir and a digital fluidics (DF) device. The assay reservoir may include an outlet port and have a liquid therein. The DF device may have a receiving cavity that is configured to receive the liquid from the assay reservoir.

The method 740 may also include blocking (at 744) flow of the liquid through the outlet port using a movable plug. The movable plug may have any shape that is capable of blocking flow through the outlet port. For example, the movable plug may be shaped relative to the outlet port. The method may also include moving (at 746) the assay reservoir and a plug-engaging surface relative to each other such that the plug-engaging surface displaces the movable plug. The plug-engaging surface may be a flat surface. Alternatively, the plug-engaging surface may be a projection (e.g., pin) that projects away from a bottom of the receiving cavity. With the movable plug displaced, the liquid in the assay reservoir may flow through the outlet port into the receiving cavity.

Optionally, the method 740 may include using (at 748) the liquid to conduct electrowetting operations within the DF device. Similar to other methods, the method 740 may include determining (at 750) a volume of the liquid within the receiving cavity. The moving (at 746) may be based on the volume of the liquid within the receiving cavity. In some cases, the determining (at 750) occurs only once before the moving (at 746) and the moving (at 746) results in completely depleting the assay reservoir. For example, the operational data may indicate that the volume of the liquid within the receiving cavity is lower than a designated baseline. To re-load the receiving cavity with the liquid, the assay reservoir and the plug-engaging surface may be moved relative to each other to displace the movable plug.

Figure 16:
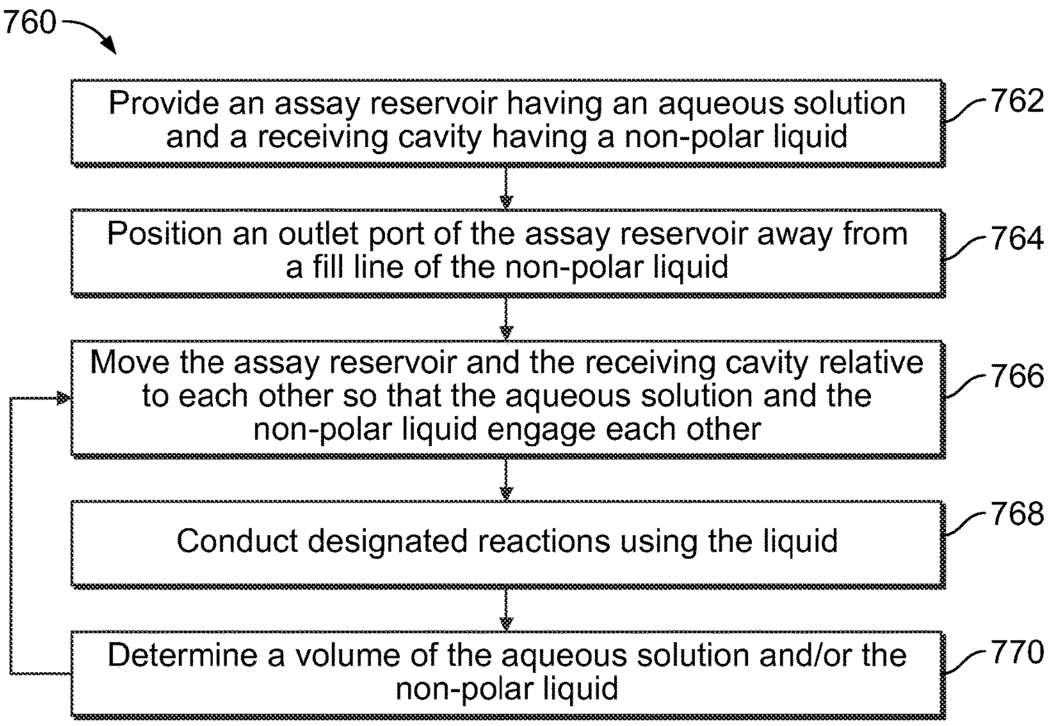
FIG. 16 is a flowchart illustrating a method in accordance with an embodiment.

FIG. 16 is a flowchart illustrating a method 760 in accordance with an embodiment. The method 760 may employ, for example, structures or aspects of various embodiments (e.g., systems and/or methods) discussed herein, such as those shown in FIGS. 1-3, 10, 11, and 12. The method 760 may include providing (at 762) an assay reservoir holding an aqueous solution and a receiving cavity holding a non-polar liquid relative to each other. The assay reservoir may have an outlet port that is dimensioned to hold the aqueous solution within the assay reservoir.

The method 760 may also include positioning (at 764) the outlet port a distance away from a fill line of the non-polar liquid in the receiving cavity. In such as position, air exists within the space between the aqueous solution and the non-polar liquid. Collectively, forces prevent the aqueous solution from flowing through the outlet port and into the receiving cavity. More specifically, the adhesive forces between the material of the assay reservoir and the aqueous solution and the cohesive forces along the liquid-gas interface combined to retain the aqueous solution at the outlet port.

The method 760 may also include moving (at 766) the assay reservoir and the receiving cavity relative to each other so that the aqueous solution and the non-polar liquid engage each other. When the aqueous solution and the non-polar liquid engage each other, the liquid-gas interface is removed and changes to a liquid-liquid interface between the aqueous solution and the non-polar liquid. At this time, the cohesive and adhesive forces may be affected such that the aqueous solution flows through the outlet port and into the receiving cavity. Similar to other methods, the method 760 may include conducting (at 768) designated reactions using the aqueous solution and/or the non-polar liquid. Optionally, the method 760 may include determining (at 770) a volume of the aqueous solution and/or a volume of the non-polar liquid. In some cases, the determining (at 770) occurs only once before the moving (at 766) and the moving (at 766) results in completely depleting the assay reservoir.

Accordingly, the various embodiments (e.g., systems and methods) may use one or more feedback mechanisms based on operational data, such as volume data, to determine when and/or how much liquid should be loaded. In other embodiments, a feedback mechanism is not used. Instead, the loading of the liquid may be based on a pre-programmed schedule that is sufficient for the assay protocol.

With respect to methods described herein, such as the methods 700 (FIG. 13), 720 (FIG. 14), 740 (FIG. 15), and 760 (FIG. 16), it is understood that the corresponding flowcharts illustrate only one embodiment. In various embodiments, certain steps of the methods may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

With respect to the various systems described herein, it should be noted that a particular arrangement of components (e.g., the number, types, placement, or the like) of the illustrated embodiments may be modified in various alternate embodiments. In various embodiments, different numbers of a given component may be employed, a different type or types of a given component may be employed, a given component may be added, or a given component may be omitted. Moreover, one or more features of the various systems may be combined with another system or may be substituted into another system.

In accordance with an embodiment, a system configured to conduct designated reactions for biological or chemical analysis is provided. The system includes a liquid-exchange assembly having an assay reservoir for holding a first liquid, a receiving cavity for holding a second liquid that is immiscible with respect to the first liquid, and an exchange port that fluidically connects the assay reservoir and the receiving cavity. The system also includes a pressure activator that is operably coupled to the assay reservoir of the liquid-exchange assembly. The pressure activator is configured to repeatedly exchange the first and second liquids by (a) driving a designated volume of the first liquid through the exchange port into the receiving cavity and (b) drawing a designated volume of the second liquid through the exchange port into the assay reservoir. The system also includes a fluidic system that is in flow communication with the liquid-exchange assembly. The fluidic system is configured to conduct designated chemical reactions using at least one of the first liquid or the second liquid.

In one aspect, the designated volumes may be between 1.0 and 40.0 μL.

In another aspect, the pressure activator may include a plunger that is configured to move between first and second positions. The plunger may drive the designated volume of the first liquid when moving from the first position to the second position and draw the designated volume of the second liquid when moving from the second position to the first position. Optionally, the plunger includes a flexible membrane that is biased to flex back to the second position after being moved to the first position by the pressure activator.

In another aspect, the system may include a system controller configured to automatically control the pressure activator to drive the first liquid into the receiving cavity and draw the second liquid into the assay reservoir. Optionally, the system controller may be configured to control the pressure activator to exchange the first and second liquids at an exchange rate. The exchange rate may be predetermined based a designated protocol carried out by the fluidic system.

In another aspect, the fluidic system may include a digital fluidics (DF) device having the receiving cavity and a device channel in flow communication with the receiving cavity. The DF device may include electrodes positioned along the device channel that are configured to conduct electrowetting operations for moving droplets of the first liquid along the device channel. The assay reservoir may be located upstream with respect to the device channel.

In another aspect, the fluidic system may include a DF device having the receiving cavity and a device channel in flow communication with the receiving cavity. The DF device may include electrodes positioned along the device channel that are configured to conduct electrowetting operations for moving droplets of the second liquid along the device channel. The assay reservoir may be located downstream with respect to the device channel.

In another aspect, the assay reservoir may have a reservoir liquid volume before the first and second liquids are exchanged. The reservoir liquid volume may remain substantially equal after multiple exchanges of the first and second liquids.

In another aspect, the liquid-exchange assembly and the fluidic system may constitute a closed liquid network such that a total liquid volume of the first and second liquids within the liquid network remains substantially equal throughout operation of the system.

In accordance with an embodiment, a method is provided that includes fluidically coupling an assay reservoir holding a first liquid and a receiving cavity holding a second liquid through an exchange port. The first and second liquids are immiscible. The method also includes exchanging the first and second liquids by repeatedly driving a designated volume of the first liquid through the exchange port into the receiving cavity and drawing a designated volume of the second liquid through the exchange port into the assay reservoir.

In one aspect, the assay reservoir and the receiving cavity may be in flow communication with a fluidic system. The method may also include using at least one of the first liquid or the second liquid to conduct designated chemical reactions in the fluidic system for biological or chemical analysis.

In another aspect, the step of repeatedly driving the designated volume of the first liquid and drawing the designated volume of the second liquid may be caused by a plunger moving between first and second positions. The plunger may drive the designated volume of the first liquid when moving from the first position to the second position and may draw the designated volume of the second liquid when moving from the second position to the first position. Optionally, the plunger may include a flexible membrane that is biased to flex back to the second position after being moved to the first position by the pressure activator.

In another aspect, the first liquid is an aqueous solution and the second liquid is a non-polar liquid. The method may include conducting electrowetting operations to move droplets of the first liquid. Optionally, the non-polar liquid accumulates within the assay reservoir after each exchange of the first and second liquids.

In another aspect, the first liquid may be a non-polar liquid and the second liquid may be an aqueous solution and the method includes conducting electrowetting operations to move droplets of the second liquid.

In another aspect, the step of exchanging the first and second liquids through the exchange port includes exchanging the first and second liquids at an exchange rate. The exchange rate may be predetermined based on a designated protocol carried out for biological or chemical analysis. Optionally, the designated volumes of the first and second liquids are between 1.0 and 40.0 μL.

In another aspect, the assay reservoir and the receiving cavity may be in flow communication with a fluidic system that uses at least one of the first liquid or the second liquid to conduct chemical reactions in accordance with a designated protocol. The assay reservoir, the receiving cavity, and the fluidic system may form a closed liquid network such that a total volume of liquids remains substantially equal throughout the designated protocol.

In accordance with an embodiment, a liquid-transport assembly is provided that includes an assay reservoir having inlet and outlet ports. The assay reservoir is configured to hold a liquid and deliver the liquid through the outlet port. The liquid-transport assembly also includes a secondary chamber configured to hold an electrolytic solution and a loading gas, the secondary chamber being in flow communication with the inlet port of the assay reservoir. The liquid-transport assembly also includes a pressure generator having first and second electrodes within the secondary chamber. The pressure generator provides a voltage between the first and second electrodes to generate the loading gas from the electrolytic solution, wherein a pressure imposed on the liquid in the assay reservoir increases as the loading gas is generated in the secondary chamber thereby causing the liquid to flow through the outlet port.

In one aspect, the liquid-transport assembly may include a system controller configured to selectively control the voltage between the first and second electrodes to control a flow rate of the liquid through the outlet port. Optionally, the system controller may be configured to selectively oscillate the voltage to incrementally provide designated volumes of the liquid through the outlet port. Also optionally, the liquid-transport assembly may include an assay sensor configured to detect operational data regarding fluidic operations occurring downstream with respect to the assay reservoir. The system controller may be configured to increase or decrease the voltage based on the operational data.

In another aspect, the assay reservoir may be a first assay reservoir and the liquid-transport assembly may include a second assay reservoir for holding a corresponding liquid. The second assay reservoir may be in flow communication with the secondary chamber such that the pressure imposed on the liquids of the first and second assay reservoirs is substantially equal.

In another aspect, the liquid-transport assembly may include a digital fluidics (DF) device that may be in flow communication with the outlet port of the assay reservoir. The DF device has electrodes configured to conduct electrowetting operations to move droplets of the liquid away from the outlet port.

In accordance with an embodiment, a method is provided that includes providing an assay reservoir and a secondary chamber. The assay reservoir has inlet and outlet ports and holds a liquid therein. The secondary chamber is in flow communication with the inlet port of the assay reservoir and holds an electrolytic solution. The method also includes generating a loading gas in the secondary chamber through electrolysis, wherein a pressure imposed on the liquid in the assay reservoir increases as the loading gas is generated in the secondary chamber thereby causing the liquid to flow through the outlet port.

In one aspect, the step of generating the loading gas in the secondary chamber through electrolysis may include providing a voltage between first and second electrodes within the secondary chamber. Optionally, the step of providing the voltage may include selectively controlling the voltage to control a flow rate of the liquid through the outlet port. Also optionally, the step of providing the voltage may include selectively oscillating the voltage to incrementally provide designated volumes of the liquid through the outlet port.

In another aspect, the method may also include detecting operational data regarding fluidic operations occurring downstream with respect to the assay reservoir and increasing or decreasing the generation of loading gas based on the operational data.

In another aspect, the assay reservoir may be a first assay reservoir and the step of providing the first assay reservoir includes providing a second assay reservoir for holding a corresponding liquid. The second assay reservoir may be in flow communication with the secondary chamber such that the pressure imposed on the corresponding liquids of the first and second assay reservoirs is substantially equal.

In another aspect, the liquid may flow into a digital fluidics (DF) device that is in flow communication with the outlet port. The method may also include conducting electrowetting operations to move droplets of the liquid away from the outlet port.

In accordance with an embodiment, a system is provided that includes an assay reservoir having an outlet port. The assay reservoir is configured to deliver a liquid through the outlet port. The system also includes a movable plug that is positioned within the assay reservoir. The movable plug blocks flow of the liquid when positioned at the outlet port. The system also includes a digital fluidics (DF) device having a receiving cavity configured to receive the liquid. The DF device includes electrodes for conducting electrowetting operations. The system also includes a loading mechanism having a plug-engaging surface and a loading motor that is coupled to at least one of the assay reservoir or the plug-engaging surface. The loading motor moves the assay reservoir and the plug-engaging surface relative to each other such that the plug-engaging surface displaces the movable plug with respect to the outlet port thereby permitting the liquid to flow through the outlet port into the receiving cavity.

In one aspect, the movable plug may be sized and shaped relative to the outlet port such that a protruded portion of the movable plug clears the outlet port. The protruded portion moves through the outlet port when the movable plug is displaced. Optionally, the plug-engaging surface is an interior surface of the DF device that defines a bottom of the receiving cavity. The interior surface may engage the protruded portion to displace the movable plug.

In another aspect, the system may also include a dislodging projection that includes the plug-engaging surface. The dislodging projection may be sized and shaped relative to the outlet port for insertion into the outlet port.

In another aspect, the assay reservoir may include a nozzle having the outlet port. Optionally, the nozzle extends lengthwise along a central axis and has a nozzle wall that circumferentially surrounds the central axis. The nozzle wall includes openings therethrough.

In accordance with an embodiment, a method is provided that includes providing an assay reservoir and a digital fluidics (DF) device. The assay reservoir includes an outlet port and has a liquid therein. The DF device has a receiving cavity that is configured to receive the liquid from the assay reservoir. The method also includes blocking flow of the liquid through the outlet port using a movable plug and moving the assay reservoir and a plug-engaging surface relative to each other such that the plug-engaging surface displaces the movable plug. The liquid flows through the outlet port into the receiving cavity when the movable plug is displaced. The method also includes using the liquid to conduct electrowetting operations within the DF device.

In one aspect, the movable plug may be sized and shaped relative to the outlet port such that a protruded portion of the movable plug clears the outlet port. The protruded portion may move through the outlet port when the movable plug is displaced.

In another aspect, the plug-engaging surface may be an interior surface of the DF device that defines a bottom of the receiving cavity. The interior surface may engage the protruded portion thereby causing the movable plug to be displaced.

In another aspect, the plug-engaging surface may be part of a dislodging projection that is sized and shaped relative to the outlet port for insertion into the outlet port, wherein moving the assay reservoir and the plug-engaging surface relative to each other may include inserting the dislodging projection into the outlet port.

In another aspect, the assay reservoir may include a nozzle having the outlet port and wherein moving the assay reservoir and the plug-engaging surface relative to each other may include submerging a distal end of the nozzle within a different liquid held by the receiving cavity. Optionally, the nozzle extends lengthwise along a central axis and has a nozzle wall that circumferentially surrounds the central axis. The nozzle wall may include openings therethrough.

In accordance with an embodiment, a system is provided that includes an assay reservoir configured to hold an aqueous solution. The assay reservoir includes an outlet port defined by an interior surface of the assay reservoir. The interior surface has a surface energy. The system also includes a digital fluidics (DF) device having a receiving cavity and a device channel in flow communication with the receiving cavity. The DF device includes electrodes positioned along the device channel that are configured to conduct electrowetting operations for moving droplets along the device channel. The receiving cavity is configured to hold a non-polar liquid and is located upstream with respect to the device channel. The system also includes a loading motor that is coupled to at least one of the assay reservoir or the DF device. The loading motor is configured to move the outlet port and the receiving cavity relative to each other such that the aqueous solution at the outlet port and the non-polar liquid in the receiving cavity engage each other. The interior surface is dimensioned and the surface energy is configured to retain the aqueous solution within the assay reservoir before the aqueous solution engages the non-polar liquid. The interior surface is dimensioned and the surface energy is configured to permit the aqueous solution to flow through the outlet port and into the receiving cavity when the aqueous solution engages the non-polar liquid.

In one aspect, the assay reservoir may include an inlet port that permits gas to flow therethrough as the aqueous solution flows through the outlet port.

In another aspect, the outlet port may be oriented such that the aqueous solution experiences a gravitational force generally toward the outlet port.

In another aspect, the system includes a system controller that commands the loading motor to move the outlet port and the receiving cavity relative to each other after determining that a low volume of the aqueous solution exists within the receiving cavity.

In accordance with an embodiment, a method is provided that includes providing an assay reservoir holding an aqueous solution and a receiving cavity holding a non-polar liquid relative to each other. The assay reservoir has an outlet port. The method also includes positioning the outlet port a distance away from a fill line of the non-polar liquid in the receiving cavity. The aqueous solution experiences cohesive and adhesive forces that retain the aqueous solution at the outlet port when the aqueous solution and the non-polar liquid are spaced apart. The method also includes moving the assay reservoir and the receiving cavity relative to each other so that the aqueous solution and the non-polar liquid engage each other. The cohesive and adhesive forces are affected such that the aqueous solution flows through the outlet port and into the receiving cavity.

In one aspect, the assay reservoir may have an inlet port that permits gas to flow therethrough as the aqueous solution flows through the outlet port.

In another aspect, the step of positioning the outlet port includes orienting the outlet port such that the aqueous solution experiences a gravitational force generally toward the outlet port.

In another aspect, the method includes determining that a low volume of the aqueous solution exists within the receiving cavity prior to moving the assay reservoir and the receiving cavity relative to each other.

In another aspect, the method includes using the aqueous solution to conduct designated chemical reactions for biological or chemical analysis. Optionally, the step of using the aqueous solution includes performing electrowetting operations to move droplets of the aqueous solution.

In accordance with an embodiment, a system configured to transport liquid. The system includes a liquid-exchange assembly having an assay reservoir for holding a first liquid, a receiving cavity for holding a second liquid that is immiscible with respect to the first liquid, and an exchange port that fluidically connects the assay reservoir and the receiving cavity. The system also includes a pressure activator that is operably coupled to the assay reservoir of the liquid-exchange assembly. The pressure activator is configured to repeatedly exchange the first and second liquids by (a) driving a designated volume of the first liquid through the exchange port into the receiving cavity and (b) drawing a designated volume of the second liquid through the exchange port into the assay reservoir.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements whether or not they have that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. An assay system configured to conduct designated reactions for biological or chemical analysis, the assay system comprising:

a liquid-exchange assembly comprising an assay reservoir for holding a first liquid, a receiving cavity for holding a second liquid that is immiscible with respect to the first liquid, and an exchange port fluidically connecting the assay reservoir and the receiving cavity, the liquid-exchange assembly also including a pressure activator that is operably coupled to the assay reservoir of the liquid-exchange assembly, the pressure activator decreasing the first liquid in the assay reservoir and increasing the second liquid in the assay reservoir by exchanging the first and second liquids, the pressure activator exchanging the first and second liquids by repeatedly (a) flowing a designated volume of the first liquid through the exchange port into the receiving cavity and (b) flowing a designated volume of the second liquid through the exchange port into the assay reservoir; and a fluidic system in flow communication with or including the receiving cavity of the liquid-exchange assembly, the fluidic system configured to conduct designated chemical reactions using at least one of the first liquid or the second liquid.

2. The assay system of claim 1, wherein the pressure activator includes a plunger that is configured to move between first and second positions, the plunger causing the designated volume of the first liquid to flow when moving from the first position to the second position and causing the designated volume of the second liquid to flow when moving from the second position to the first position.

3. The assay system of claim 2, wherein the plunger includes a flexible membrane that is biased to flex back to the second position after being moved to the first position by the pressure activator.

4. The assay system of claim 1, further comprising a system controller configured to automatically control the pressure activator to cause the first liquid to flow into the receiving cavity and cause the second liquid to flow into the assay reservoir.

5. The assay system of claim 4, wherein the system controller is configured to control the pressure activator to exchange the first and second liquids at an exchange rate, the exchange rate being predetermined based on a designated protocol carried out by the fluidic system.

6. The assay system of claim 1, wherein the fluidic system includes a digital fluidics (DF) device having the receiving cavity and a device channel in flow communication with the receiving cavity, the DF device including electrodes positioned along the device channel that are configured to conduct electrowetting operations for moving droplets of the first liquid along the device channel, the assay reservoir being located upstream with respect to the device channel.

7. The assay system of claim 1, wherein the fluidic system includes a DF device having the receiving cavity and a device channel in flow communication with the receiving cavity, the DF device including electrodes positioned along the device channel that are configured to conduct electrowetting operations for moving droplets of the second liquid along the device channel, the assay reservoir being located downstream with respect to the device channel.

8. The assay system of claim 1, wherein the assay reservoir has a reservoir liquid volume before the first and second liquids are exchanged, the reservoir liquid volume remaining substantially equal after multiple exchanges of the first and second liquids.

9. The assay system of claim 1, wherein the liquid-exchange assembly and the fluidic system constitute a closed liquid network such that a total liquid volume of the first and second liquids within the liquid network remains substantially equal throughout operation of the assay system.

10. The assay system of claim 1, wherein the designated volumes are between 1.0 and 40.0 μL.

11. The assay system of claim 1, wherein the assay reservoir and the exchange port are positioned relative to each other such that gravity causes the designated volume of the second liquid to move away from the exchange port and causes the first liquid within the assay reservoir to occupy space adjacent to the exchange port.

12. The assay system of claim 1, wherein the pressure activator displaces the first liquid in the assay reservoir to drive the designated volume of the first liquid through the exchange port into the receiving cavity and then displaces the first liquid in the assay reservoir to draw the designated volume of the second liquid through the exchange port into the assay reservoir.

13. The assay system of claim 1, wherein the liquid-exchange assembly merges the designated volumes of the second liquid with a larger volume of the second liquid within the assay reservoir.

14. The assay system of claim 1, further comprising a liquid sensor that detects a predetermined property of the first liquid within the receiving cavity and communicates a signal that is representative of the predetermined property, wherein the predetermined property is based on a volume of the first liquid within the receiving cavity.

15. The assay system of claim 14, further comprising a system controller that selectively controls the pressure activator based upon the signal.

16. The assay system of claim 6, wherein exchanging the first and second liquids does not affect movement of the droplets along the device channel.

17. A method of using the assay system of claim 1, the method comprising:

repeatedly exchanging the first and second liquids, wherein the designated volume of the second liquid merges with another volume of the second liquid within the assay reservoir thereby accumulating within the assay reservoir.

18. The method of claim 17, wherein the first liquid is an aqueous solution and the second liquid is a non-polar liquid, the method including conducting electrowetting operations to move droplets of the first liquid.

19. The method of claim 17, wherein the first liquid is a non-polar liquid and the second liquid is an aqueous solution and the method includes conducting electrowetting operations to move droplets of the second liquid.

20. The method of claim 17, wherein the assay reservoir, the receiving cavity, and the fluidic system form a closed liquid network such that a total volume of liquids remains substantially equal throughout the designated protocol, wherein the designated volumes of the first and second liquids are between 1.0 and 40.0 μL.

21. The method of claim 17, wherein the designated volumes of the first and second liquids are permitted to form into respective droplets, wherein gravity causes the respective droplet of the first liquid within the receiving cavity to move away from the exchange port and the respective droplet of the second liquid within the assay reservoir to be displaced by the first liquid.

* * * * *